(12) United States Patent
Yoda et al.

(10) Patent No.: US 12,104,947 B2
(45) Date of Patent: Oct. 1, 2024

(54) ABNORMALITY ASSESSMENT DEVICE USING OPTICAL FIBER SENSING SYSTEM

(71) Applicant: NEC Corporation, Tokyo (JP)

(72) Inventors: Yukihide Yoda, Tokyo (JP); Naoto Ogura, Tokyo (JP); Yoshiaki Aono, Tokyo (JP)

(73) Assignee: NEC CORPORATION, Tokyo (JP)

( * ) Notice: Subject to any disclaimer, the term of this patent is extended or adjusted under 35 U.S.C. 154(b) by 286 days.

(21) Appl. No.: 17/626,187

(22) PCT Filed: Jul. 8, 2020

(86) PCT No.: PCT/JP2020/026687
§ 371 (c)(1),
(2) Date: Jan. 11, 2022

(87) PCT Pub. No.: WO2021/010251
PCT Pub. Date: Jan. 21, 2021

(65) Prior Publication Data
US 2022/0276089 A1   Sep. 1, 2022

(30) Foreign Application Priority Data
Jul. 17, 2019   (JP) .................. 2019-132271

(51) Int. Cl.
*G01H 9/00*   (2006.01)
*G08B 21/18*   (2006.01)
(52) U.S. Cl.
CPC ............. *G01H 9/004* (2013.01); *G08B 21/18* (2013.01)

(58) Field of Classification Search
None
See application file for complete search history.

(56) References Cited

U.S. PATENT DOCUMENTS

2018/0267201 A1   9/2018   Lewis

FOREIGN PATENT DOCUMENTS

| CN | 1598494 A | 3/2005 |
| CN | 103345808 A | 10/2013 |
| CN | 105841793 A | 8/2016 |
| CN | 106500821 A | 3/2017 |
| CN | 206988826 U | 2/2018 |
| CN | 107862821 A | 3/2018 |
| GB | 2539254 A | 12/2016 |
| JP | H05-180690 A | 7/1993 |

(Continued)

OTHER PUBLICATIONS

Extended European Search Report for EP Application No. 20839830.5, dated on Jul. 18, 2022.

(Continued)

*Primary Examiner* — Brandi N Hopkins
*Assistant Examiner* — Nigel H Plumb
(74) *Attorney, Agent, or Firm* — Sughrue Mion, PLLC

(57) ABSTRACT

An optical fiber sensing system and method assessing that an abnormality has occurred when a vibration pattern of an optical signal output from an optical fiber, that detects a vibration, is not already known. When the vibration pattern of the optical signal has not occurred in accordance with a predetermined event, and the vibration pattern is an abnormal vibration pattern, assessing that the abnormality has occurred at a position at which the optical fiber detected the vibration.

15 Claims, 20 Drawing Sheets

(56) References Cited

FOREIGN PATENT DOCUMENTS

| JP | 2001-059719 A | | 3/2001 |
|---|---|---|---|
| JP | 2001-311749 A | | 11/2001 |
| JP | 2011-203116 A | | 10/2011 |
| JP | 2017-142153 A | | 8/2017 |
| JP | 2017142153 | * | 8/2017 |
| JP | WO2019022084 | * | 1/2019 |
| WO | 2016/124944 A1 | | 8/2016 |
| WO | 2019/022084 A1 | | 1/2019 |

OTHER PUBLICATIONS

Suzana Vale et al: "Fiber optic based pipeline monitoring", Mar. 18, 2013, pp. 1-7, Retrieved from the Internet: URL:http://www.youtube.com/watch?v=Y6zJbIR7gqw [retrieved on Aug. 15, 2016].
International Search Report for PCT Application No. PCT/JP2020/026687, mailed on Sep. 15, 2020.
CN Office Action for CN Application No. 202080050971, mailed on Jul. 12, 2023 with English Translation.

* cited by examiner

| CONSTRUCTION EQUIPMENT TYPE | VIBRATION PATTERN |
|---|---|
| • DUMP TRUCK<br>• POWER SHOVEL | VIBRATION PATTERN 1 |
| • TRUCK<br>• POWER SHOVEL | VIBRATION PATTERN 2 |
| ... | ... |

Fig. 5

| ID | PERIOD | TIME ZONE | PLACE (ADDRESS) | CONSTRUCTION EQUIPMENT TYPE | WORK CONTENT |
|---|---|---|---|---|---|
| A | 5/10 | 9:00~19:00 | A ROAD Xm~Ym | · DUMP TRUCK<br>· POWER SHOVEL<br>· LOADER | ROAD SURFACING |
| B | 5/12~5/14 | 8:00~17:00 | B CITY NEAR O~△ | · TRUCK<br>· POWER SHOVEL | PIPING WORK (EXCAVATION) |
| B | 5/16~5/30 | 21:00~29:00 | C LARGE BRIDGE | · CRANE<br>· DUMP TRUCK | REPAIR WORK |
| ⋮ | ⋮ | ⋮ | ⋮ | ⋮ | ⋮ |

Fig. 6

[NORMAL VIBRATION PATTERN]

[ABNORMAL VIBRATION PATTERN]

[VIBRATION PATTERN OF NORMAL OPTICAL FIBER]

[VIBRATION PATTERN OF DEGRADED OPTICAL FIBER]

| TYPE OF VIBRATION PATTERN | DEGRADATION STATE OF OPTICAL FIBER |
|---|---|
| VIBRATION PATTERN A | NORMAL |
| VIBRATION PATTERN B | ABNORMAL (DEGRADATION DEGREE 1) |
| VIBRATION PATTERN C | ABNORMAL (DEGRADATION DEGREE 2) |

# ABNORMALITY ASSESSMENT DEVICE USING OPTICAL FIBER SENSING SYSTEM

This application is a National Stage Entry of PCT/JP2020/026687 filed on Jul. 8, 2020, which claims priority from Japanese Patent Application 2019-132271 filed on Jul. 17, 2019, the contents of all of which are incorporated herein by reference, in their entirety.

TECHNICAL FIELD

The present disclosure relates to an optical fiber sensing system, optical fiber sensing equipment, and an abnormality assessment method.

BACKGROUND ART

When work occurs on the ground, there is a possibility that a power transmission pipe provided in the ground near the place of the occurrence of the work, or a power transmission line that is passed through the power transmission pipe, is affected by the aboveground work and is damaged.

Conventionally, a worker makes a periodical patrol to confirm whether the power transmission pipe or power transmission line is affected by the aboveground work. However, in order to efficiently make such a patrol, it is preferable that the patrol is made in accordance with the occurrence of the work.

Here, when work is conducted, it is necessary to submit a notice to a city, town or village in advance. In the case of work, a notice of which was submitted to the city, town or village, the place of the occurrence of work and the date/time of the occurrence of the work can be grasped in advance, and so a patrol can be made in accordance with the occurrence of the work.

In recent years, however, unlicensed work (also called unauthorized work or unapplied work), a notice of which is not submitted to a city, town or village, has frequently occurred. In the case of such unlicensed work, it is not possible to grasp in advance the place of the occurrence of work and the date/time of the occurrence of the work.

Thus, there is a demand for technology which can detect the occurrence of work. As an example of such technology, Patent Literature 1, for example, discloses technology of detecting the occurrence of work, based on vibration which a vibration sensor or an optical fiber detected.

CITATION LIST

Patent Literature

Patent Literature 1: Japanese Unexamined Patent Application Publication No. 2001-059719

SUMMARY OF INVENTION

Technical Problem

However, in the technology disclosed in Patent Literature 1, a countermeasure against surrounding environment vibration (for example, vibration occurring due to the passage of an automobile or a train) is not taken into account, and there is a problem that the occurrence of work may erroneously be detected.

The object of the present disclosure is to provide an optical fiber sensing system, optical fiber sensing equipment, and an abnormality assessment method, which can solve the above problem, and can suppress erroneous detection of the occurrence of an abnormality such as work.

Solution to Problem

An optical fiber sensing system according to one aspect includes:
  an optical fiber configured to detect vibration;
  a reception unit configured to receive, from the optical fiber, an optical signal on which the vibration detected by the optical fiber is superimposed; and
  an abnormality assessment unit configured to assess whether a vibration pattern of the optical signal is already known, and to assess, when the vibration pattern of the optical signal is not already known, that an abnormality has occurred.

Optical fiber sensing equipment according to one aspect includes:
  a reception unit configured to receive, from an optical fiber configured to detect vibration, an optical signal on which the vibration detected by the optical fiber is superimposed; and
  an abnormality assessment unit configured to assess whether a vibration pattern of the optical signal is already known, and to assess, when the vibration pattern of the optical signal is not already known, that an abnormality has occurred.

An abnormality assessment method according to one aspect includes:
  a step of detecting vibration by an optical fiber;
  a reception step of receiving, from the optical fiber, an optical signal on which the vibration detected by the optical fiber is superimposed; and
  an abnormality assessment step of assessing whether a vibration pattern of the optical signal is already known, and assessing, when the vibration pattern of the optical signal is not already known, that an abnormality has occurred.

Advantageous Effects of Invention

According to the above aspects, such an advantageous effect can be obtained that it is possible to provide an optical fiber sensing system, optical fiber sensing equipment, and an abnormality assessment method, which can suppress erroneous detection of the occurrence of an abnormality.

BRIEF DESCRIPTION OF DRAWINGS

FIG. 5 is a diagram illustrating an example of a list of vibration patterns which a storage unit according to the second example embodiment stores;

FIG. 6 is a diagram illustrating an example of information of work, which the storage unit according to the second example embodiment stores;

DESCRIPTION OF EMBODIMENTS

Figure 1:
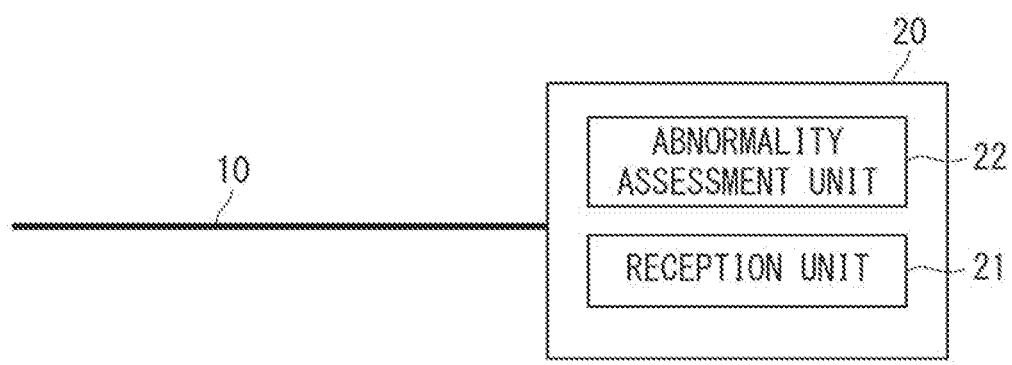
FIG. 1 is a diagram illustrating a configuration example of an optical fiber sensing system according to a first example embodiment.

Hereinafter, example embodiments of the present disclosure will be described with reference to the drawings. Note that omissions and simplification are made as appropriate in the following description and drawings for the purpose of clearer description. In addition, in the drawings, the same elements are denoted by the same reference signs, and an overlapping description is omitted unless where necessary.

First Example Embodiment

To begin with, referring to FIG. 1, a configuration example of an optical fiber sensing system according to a first example embodiment will be described.

As illustrated in FIG. 1, the optical fiber sensing system according to the first example embodiment includes an optical fiber 10 and optical fiber sensing equipment 20. In addition, the optical fiber sensing equipment 20 includes a reception unit 21 and an abnormality assessment unit 22.

The optical fiber 10 is laid on a monitoring target or thereabout, and one end of the optical fiber 10 is connected to the optical fiber sensing equipment 20. For example, when the monitoring target is a road, the optical fiber 10 is disposed in the ground under the road. In addition, when the monitoring target is a bridge, the optical fiber 10 is disposed along the bridge. However, the monitoring target is not limited to the road or bridge, and may be any target on which work may occur.

The reception unit 21 makes pulse light incident in the optical fiber 10. In addition, the reception unit 21 receives reflective light or scattered light, which occurs due to the transmission of the pulse light through the optical fiber 10, as return light (an optical signal) via the optical fiber 10.

If vibration occurs near the optical fiber 10, the vibration is superimposed on the return light which is transmitted by the optical fiber 10. Thus, the optical fiber 10 can detect vibration which occurs near the optical fiber 10.

Accordingly, if vibration occurs near the optical fiber 10, the optical fiber 10 detects the vibration, superimposes the vibration on the return light, and transmits the return light, and the reception unit 21 receives the return light on which the vibration detected by the optical fiber 10 is superimposed.

Here, the return light, on which the vibration is superimposed, has a characteristic vibration pattern in which the strength and weakness of vibration, the position of vibration, the transition of variation in vibration frequency, and the like are different. Thus, by analyzing the dynamic variation of the vibration pattern of the return light, it is possible to assess whether the vibration pattern is already known.

Thus, from the return light which the reception unit 21 receives from the optical fiber 10, the abnormality assessment unit 22 detects the vibration pattern of the return light, and assesses whether the vibration pattern of the return light is an already known vibration pattern.

For example, the abnormality assessment unit 22 may assess whether the vibration pattern of the return light is an already known vibration pattern, by utilizing pattern matching. In this case, already known vibration patterns are prestored in a storage unit (not shown). The abnormality assessment unit 22 compares the vibration pattern of the return light with the vibration patterns stored in the storage unit (not shown). When the vibration pattern of the return light includes a vibration pattern other than the vibration patterns stored in the storage unit (not shown), the abnormality assessment unit 22 assesses that the vibration pattern of the return light is not already known.

In addition, when the vibration pattern of the return light is not already known, the abnormality assessment unit 22 assesses that an abnormality has occurred.

For example, a vibration pattern of environment vibration (for example, vibration occurring due to the passage of an automobile or a train) is already known. Thus, even if environment vibration occurs nearby, the abnormality assessment unit 22 does not assess that an abnormality has occurred. Thereby, even if environment vibration occurs nearby, it is possible to suppress erroneous detection of the occurrence of work.

Next, referring to FIG. 2, a description will be given of an operation example of the optical fiber sensing system according to the first example embodiment.

Figure 2:
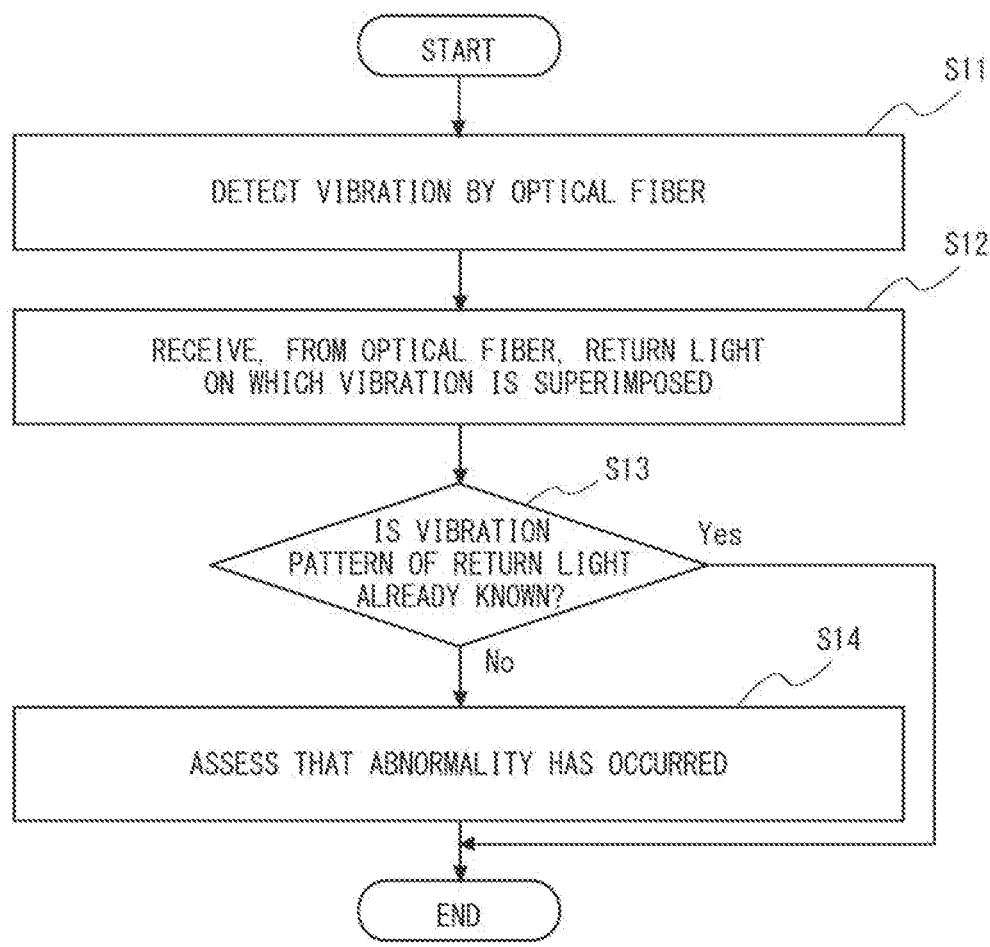
FIG. 2 is a flowchart illustrating an operation example of the optical fiber sensing system according to the first example embodiment.

As illustrated in FIG. 2, the optical fiber 10 detects vibration (step S11). The vibration detected by the optical fiber 10 is superimposed on return light which is transmitted through the optical fiber 10.

Then, the reception unit 21 receives, from the optical fiber 10, the return light on which the vibration detected by the optical fiber 10 is superimposed (step S12).

Subsequently, the abnormality assessment unit 22 assesses whether the vibration pattern of the return light received by the reception unit 21 is already known (step S13). This assessment may be performed, for example, by utilizing pattern matching, as described above.

When the vibration pattern of the return light is already known (Yes in step S13), the process ends.

On the other hand, when the vibration pattern of the return light is not already known (No in step S13), the abnormality assessment unit 22 assesses that an abnormality has occurred (step S14).

As described above, according to the first example embodiment, the reception unit 21 receives, from the optical fiber 10, the return light on which the vibration detected by the optical fiber 10 is superimposed. When the vibration pattern of the return light is not already known, the abnormality assessment unit 22 assesses that an abnormality has occurred.

For example, a vibration pattern of vibration occurring in accordance with environment vibration is already known. Thus, even if environment vibration occurs nearby, the abnormality assessment unit 22 does not assess that an abnormality has occurred. Thereby, even if environment vibration occurs nearby, it is possible to suppress erroneous detection of the occurrence of an abnormality such as work.

Second Example Embodiment

Next, referring to FIG. 3, a description will be given of a configuration example of an optical fiber sensing system according to a second example embodiment. Note that the present second example embodiment, and third and fourth example embodiments to be described later, are examples in which the monitoring target is a road R. The road R includes a road in a tunnel, or the like.

Figure 3:
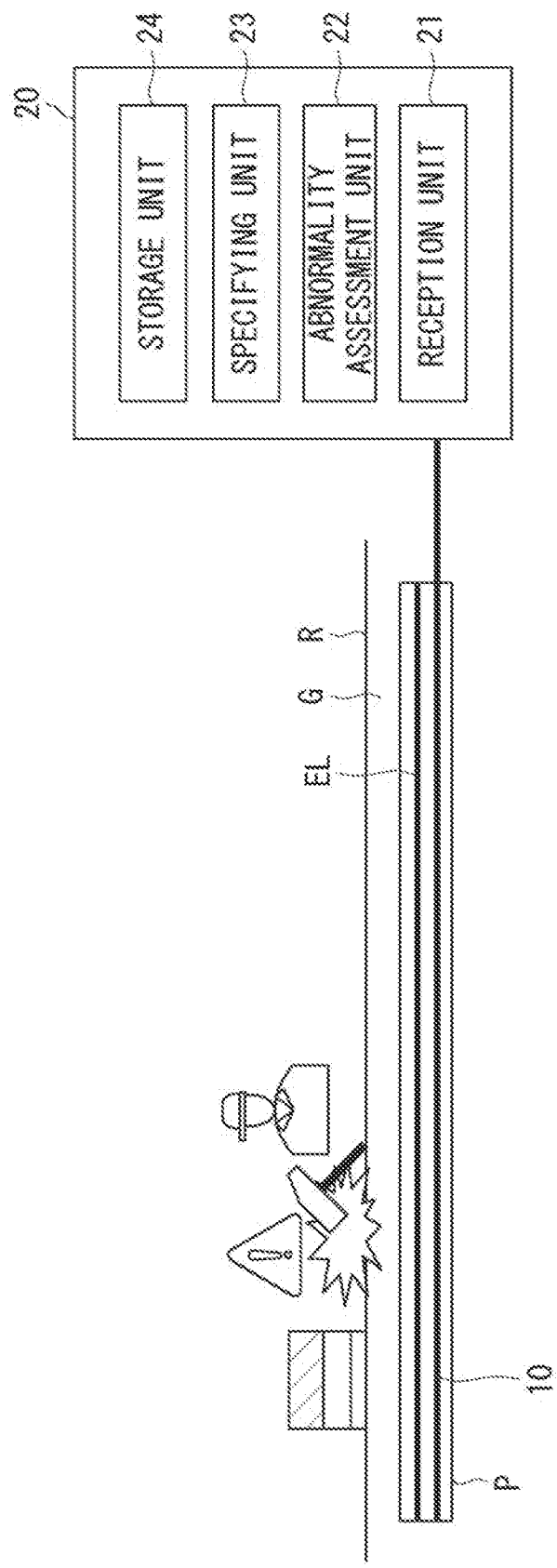
FIG. 3 is a diagram illustrating a configuration example of an optical fiber sensing system according to a second example embodiment.

As illustrated in FIG. 3, the optical fiber sensing system according to the second example embodiment differs from the above-described configuration of FIG. 1 of the first example embodiment, with respect to the point that the optical fiber 10 is disposed along the road R, and the point that a specifying unit 23 and a storage unit 24 are added to the optical fiber sensing equipment 20.

Figure 4:
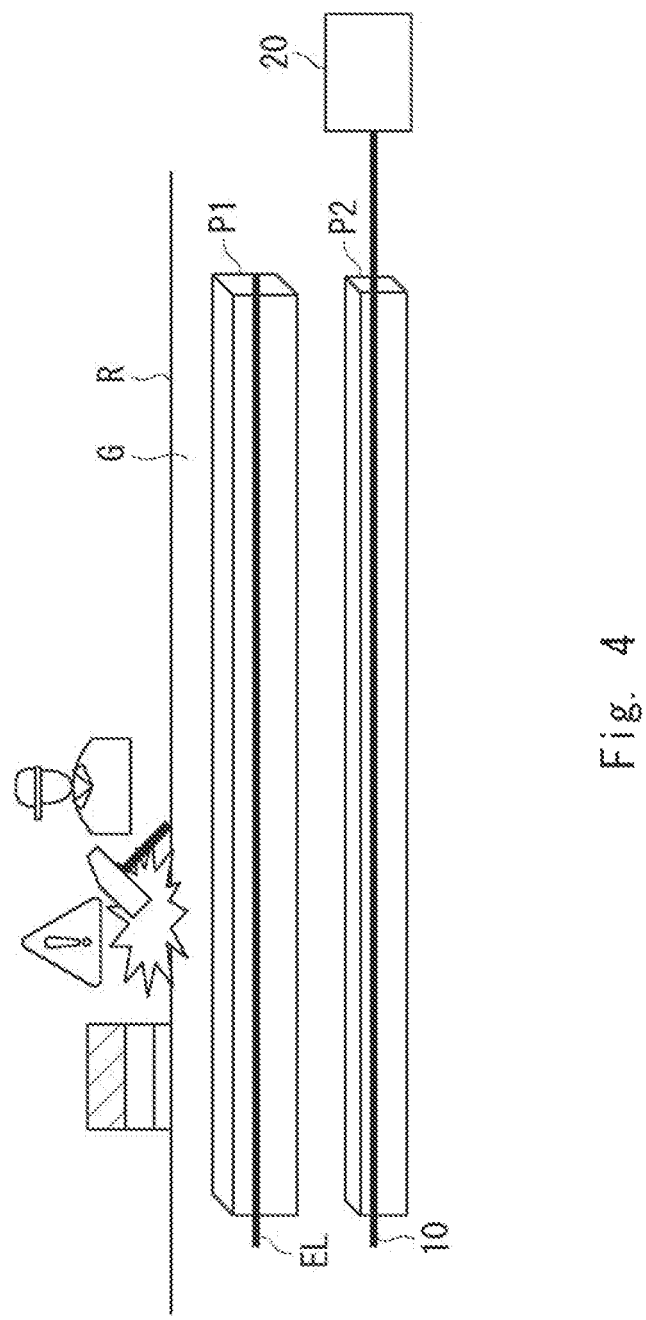
FIG. 4 is a diagram illustrating another configuration example of the optical fiber sensing system according to the second example embodiment.

The optical fiber 10 is disposed along the road R in the ground G under the road R. To be more specific, the optical fiber 10 is passed through the inside of a pipe P for a power transmission line EL, which is provided in the ground G. However, the example embodiment is not limited to this. For example, as illustrated in FIG. 4, the optical fiber 10 may be passed through the inside of a pipe P2 which is different from a pipe P1 for the power transmission line EL. Besides, the optical fiber 10 may be disposed as an aerial optical fiber along the road R in order to detect vibration occurring in work for an aerial power transmission line (not shown).

The specifying unit 23 specifies, based on return light that the reception unit 21 received from the optical fiber 10, a time at which the optical fiber 10 detected the vibration superimposed on the return light. For example, based on the time at which the reception unit 21 received the return light from the optical fiber 10, the specifying unit 23 specifies the time at which the optical fiber 10 detected the vibration.

In addition, based on the return light that the reception unit 21 received from the optical fiber 10, the specifying unit 23 specifies a position (a distance of the optical fiber 10 from the reception unit 21) at which the optical fiber 10 detected the vibration superimposed on the return light. For example, the specifying unit 23 specifies the position (the distance of the optical fiber 10 from the reception unit 21) at which the optical fiber 10 detected the vibration, based on a time difference between the time when the reception unit 21 made the pulse light incident in the optical fiber 10, and the time when the reception unit 21 received from the optical fiber 10 the return light on which the vibration is superimposed.

The storage unit 24 prestores already known vibration patterns. For example, with respect to each of combinations of construction equipment types, the storage unit 24 prestores a vibration pattern of vibration occurring when work is conducted by the combination of construction equipment types. FIG. 5 illustrates an example of a list of vibration patterns which the storage unit 24 stores. Note that the information shown in FIG. 5 is schematically expressed, and it is assumed that the information has an information format (data format) that is distinguishable in the optical fiber sensing equipment 20.

In addition, the storage unit 24 prestores information of an event, a notice of which was submitted to a city, town or village in advance. Here, the description will be given on the assumption that the event is work, but the example embodiment is not limited to this. FIG. 6 illustrates an example of information of work, a notice of which was submitted, the information being stored in the storage unit 24. Note that the information shown in FIG. 6 is schematically expressed, and it is assumed that the information has an information format (data format) that is distinguishable in the optical fiber sensing equipment 20.

In the present second example embodiment, the abnormality assessment unit 22 assesses whether the vibration pattern of the return light that the reception unit 21 received from the optical fiber 10 is an abnormal vibration pattern. The method of the assessment will be described later.

When the vibration pattern of the return light is an abnormal vibration pattern, the abnormality assessment unit 22 then assesses whether the abnormal vibration pattern is an already known vibration pattern. At this time, the abnormality assessment unit 22 assesses whether the abnormal vibration pattern is an already known vibration pattern, by referring to the already known vibration patterns stored in the storage unit 24. Specifically, the abnormality assessment unit 22 compares the abnormal vibration pattern with the vibration patterns stored in the storage unit 24. When the abnormal vibration pattern includes a vibration pattern other than the vibration patterns stored in the storage unit 24, the abnormality assessment unit 22 assesses that the abnormal vibration pattern is not already known.

When the abnormal vibration pattern is not already known, the abnormality assessment unit 22 assesses that an abnormality has occurred at a position at which the optical fiber 10 detected the vibration.

Further, when the abnormal vibration pattern is already known, the abnormality assessment unit 22 subsequently assesses whether the abnormal vibration pattern occurs in accordance with an event (work in this case), a notice of which was submitted in advance. At this time, the abnormality assessment unit 22 assesses whether the abnormal vibration pattern occurs in accordance with work, a notice of which was submitted in advance, by referring to the information of work and already known vibration patterns stored in the storage unit 24. Specifically, the abnormality assessment unit 22 first extracts, from the information of work stored in the storage unit 24, information of work conducted at the time when the optical fiber 10 detected the vibration. When the information of the corresponding work could be extracted, the abnormality assessment unit 22 then refers to the construction equipment type used in the extracted work, and extracts a vibration pattern of vibration occurring when the extracted work is conducted, from the vibration patterns stored in the storage unit 24. Then, when the abnormal vibration pattern includes the extracted vibration pattern, the abnormality assessment unit 22 assesses that the abnormal vibration pattern has occurred in accordance with the work, the notice of which was submitted in advance.

When the abnormal vibration pattern has not occurred in accordance with the work, the notice of which was submitted in advance, the abnormality assessment unit 22 assesses that an abnormality has occurred at a position at which the optical fiber 10 detected the vibration.

Here, a description will be given of an example of a method of assessing, in the abnormality assessment unit 22, whether a vibration pattern of return light is an abnormal vibration pattern.

(A1) Method A1

To begin with, a method A1 will be described.

Figure 7:
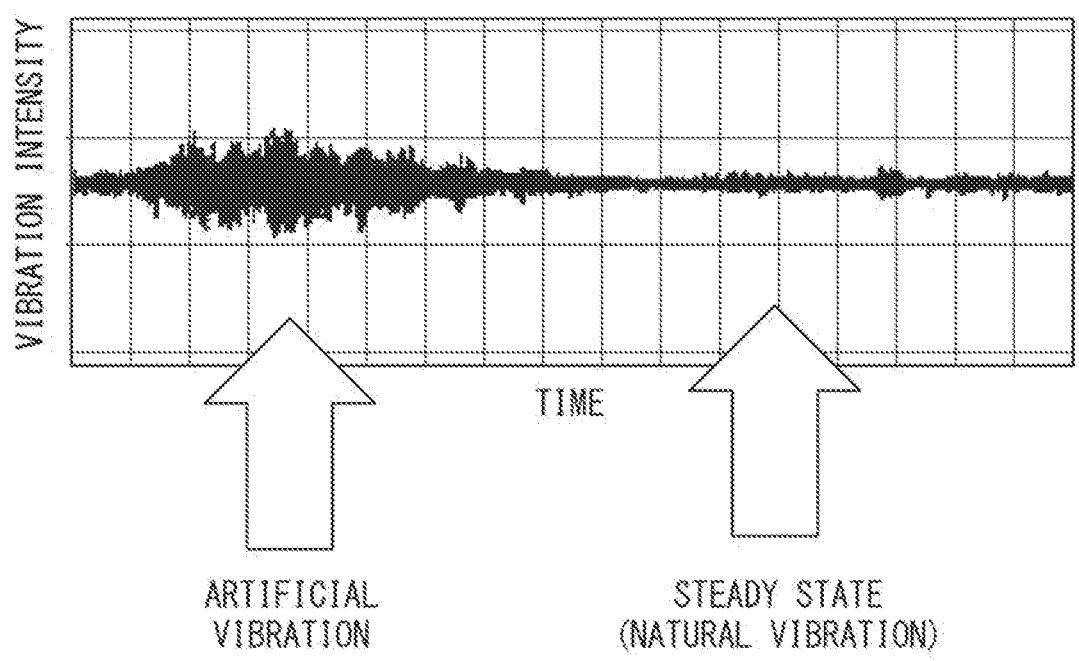
FIG. 7 is a diagram illustrating an example of a vibration pattern of return light received by a reception unit according to the second example embodiment.

FIG. 7 illustrates a vibration pattern of vibration detected at a certain position on the optical fiber 10. The abscissa axis indicates time, and the ordinate axis indicates vibration intensity.

In the example of FIG. 7, an artificial vibration first occurs, and then a steady-state vibration (natural vibration) occurs.

The abnormality assessment unit 22 assesses that the vibration pattern of the natural vibration is not an abnormal vibration pattern.

On the other hand, as regards the vibration pattern of the artificial vibration, the abnormality assessment unit 22 assesses whether this vibration pattern is an abnormal vibration pattern, as will be described below.

Figure 8:
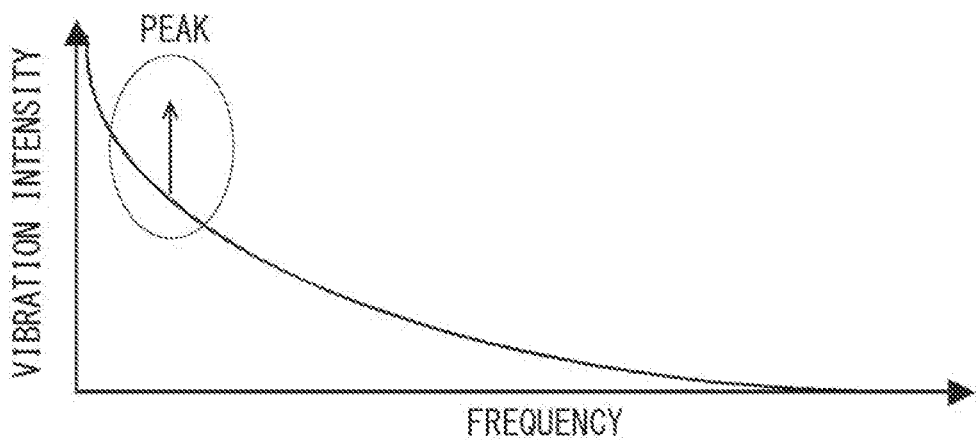
FIG. 8 is a diagram illustrating an example of a vibration pattern of return light received by the reception unit according to the second example embodiment.
Figure 9:
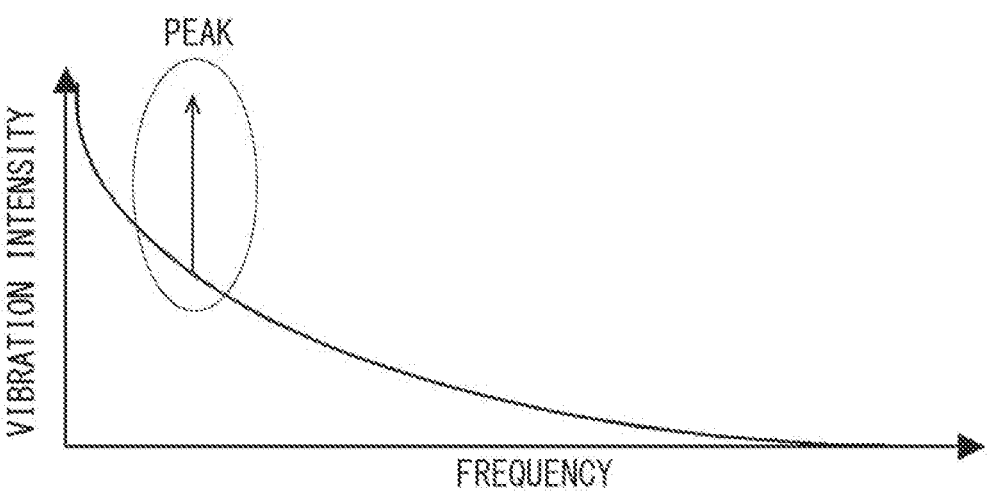
FIG. 9 is a diagram illustrating an example of a vibration pattern of return light received by the reception unit according to the second example embodiment.

FIG. 8 and FIG. 9 schematically illustrate vibration patterns obtained after subjecting a vibration pattern of artificial vibration, as illustrated in FIG. 7, to FFT (Fast Fourier Transform). The abscissa axis indicates frequency, and the ordinate axis indicates vibration intensity.

In the vibration patterns illustrated in FIG. 8 and FIG. 9, a frequency peak of vibration intensity occurs. The frequency at which the frequency peak occurs is different between normal vibration such as environment vibration (for example, vibration occurring due to the passage of an automobile or a train), and abnormal vibration occurring due to construction equipment or the like. Specifically, in the vibration pattern of the abnormal vibration occurring due to construction equipment or the like, the frequency at which the frequency peak occurs shifts more on the high-frequency side than in the vibration pattern of the normal vibration.

Thus, in the method A1, the abnormality assessment unit 22 assesses whether the vibration pattern of the return light is an abnormal vibration pattern, based on the frequency at which the frequency peak occurs in the vibration pattern of the return light.

(A2) Method A2

Next, a method A2 will be described.

Figure 10:
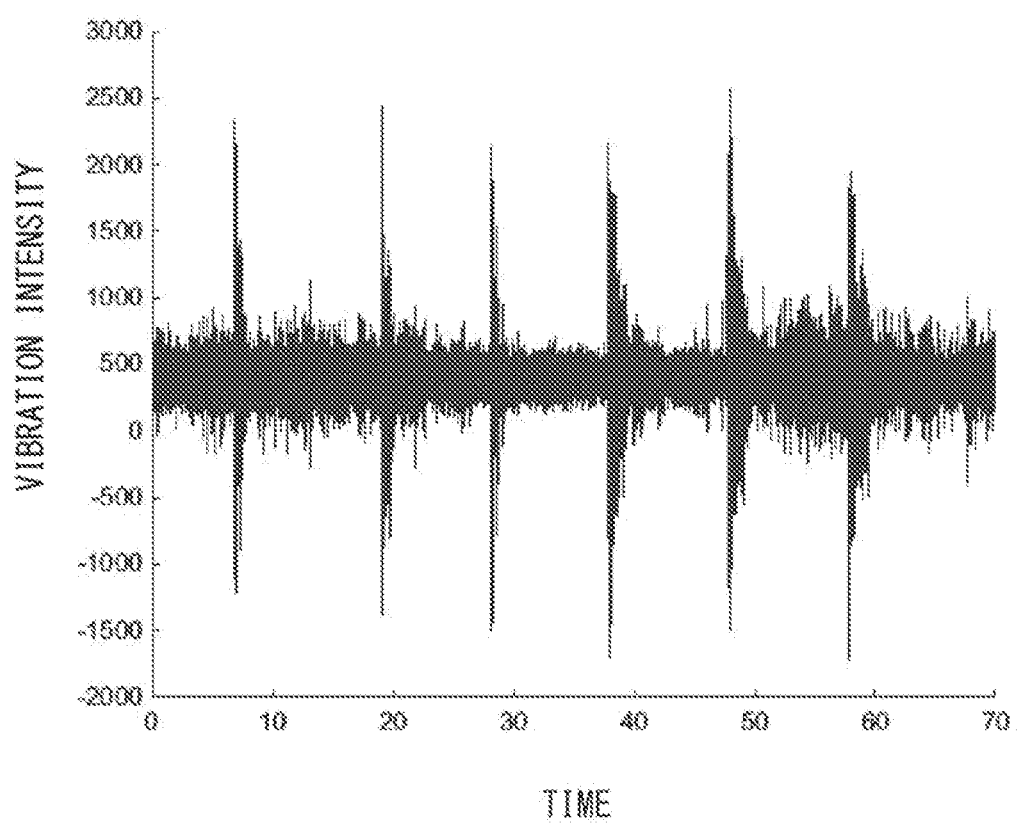
FIG. 10 is a diagram illustrating an example of a vibration pattern of return light received by the reception unit according to the second example embodiment.

FIG. 10 illustrates a vibration pattern of artificial vibration detected at a certain position on the optical fiber 10. The abscissa axis indicates time, and the ordinate axis indicates vibration intensity.

The abnormality assessment unit 22 assesses whether the vibration pattern of the return light is an abnormal vibration pattern, as will be described below.

Figure 11:
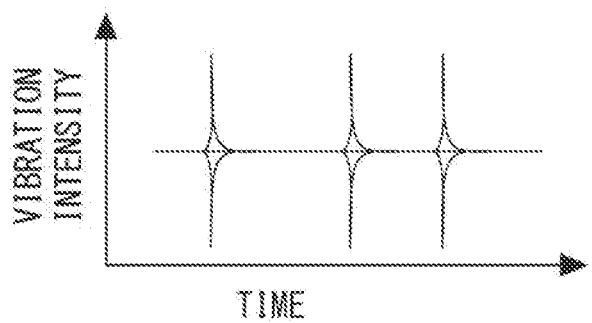
FIG. 11 is a diagram illustrating an example of a vibration pattern of return light received by the reception unit according to the second example embodiment.
Figure 12:
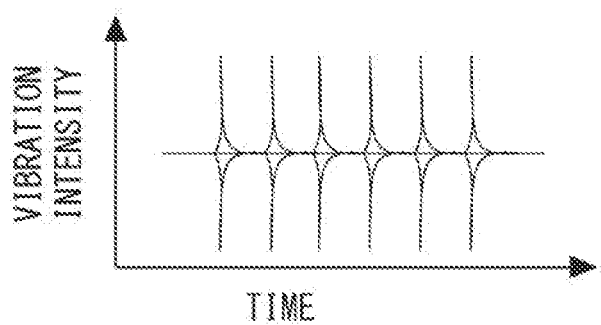
FIG. 12 is a diagram illustrating an example of a vibration pattern of return light received by the reception unit according to the second example embodiment.

FIG. 11 and FIG. 12 schematically illustrate vibration patterns of artificial vibration as illustrated in FIG. 10, and the abscissa axis and the ordinate axis in FIG. 11 and FIG. 12 indicate the same as in FIG. 10.

In the vibration patterns illustrated in FIG. 11 and FIG. 12, vibration occurs repeatedly. The intervals of the occurrence of vibration differ between the normal vibration such as environment vibration, and the abnormal vibration occurring due to construction equipment or the like. Specifically, in the vibration pattern of normal vibration, the intervals of the occurrence of vibration are irregular, and vibration occurs irregularly. By contrast, in the vibration pattern of abnormal vibration occurring due to construction equipment or the like, the intervals of the occurrence of vibration are equal, and vibration occurs regularly.

Thus, in the method A2, the abnormality assessment unit 22 assesses whether the vibration pattern of the return light is an abnormal vibration pattern, based on the intervals of the occurrence of vibration in the vibration pattern of the return light.

Next, referring to FIG. 13, a description will be given of an operation example of the optical fiber sensing system according to the second example embodiment.

Figure 13:
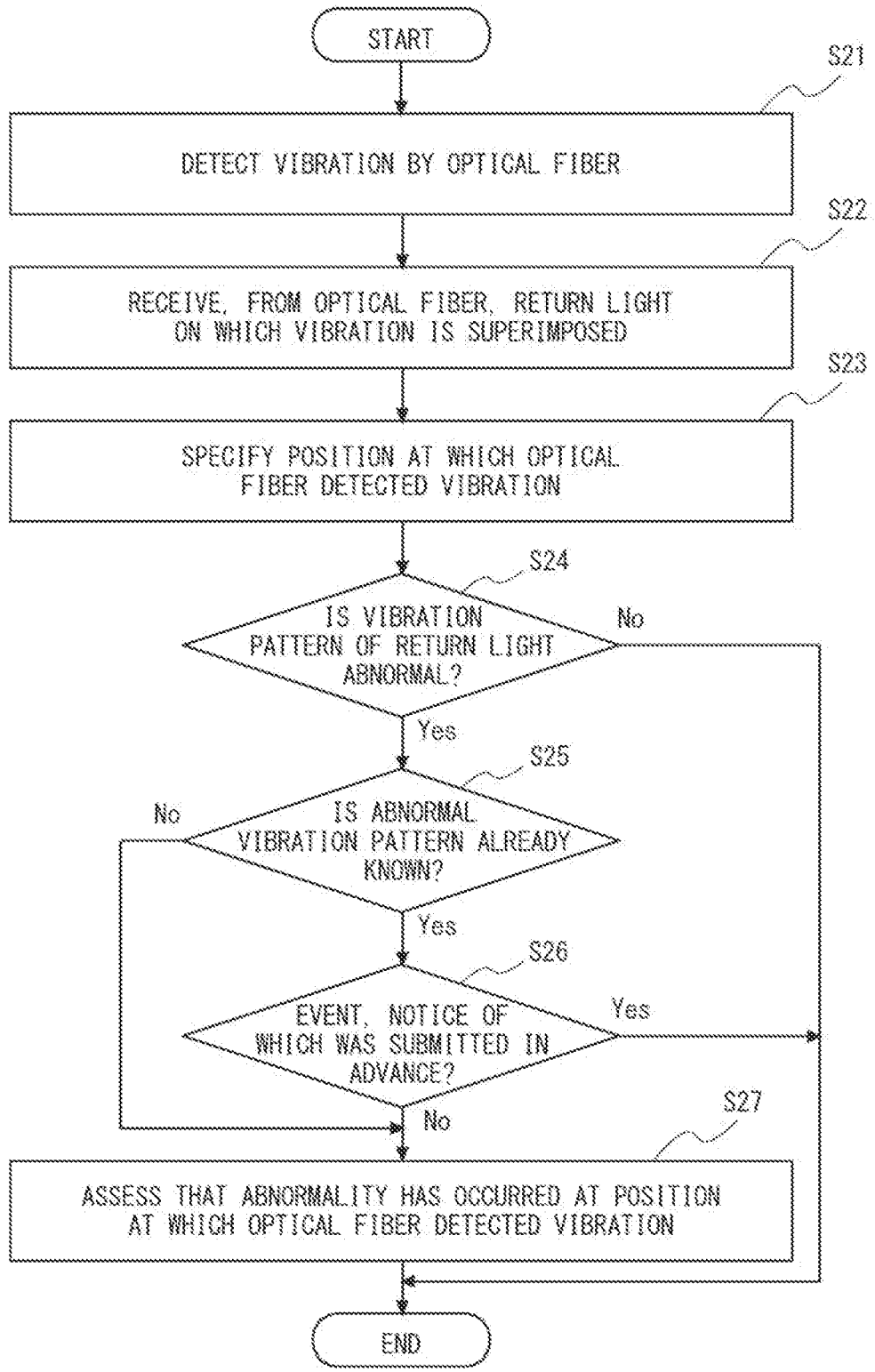
FIG. 13 is a flowchart illustrating an operation example of the optical fiber sensing system according to the second example embodiment.

As illustrated in FIG. 13, the optical fiber 10 detects vibration (step S21). The vibration detected by the optical fiber 10 is superimposed on return light which is transmitted through the optical fiber 10.

Then, the reception unit 21 receives, from the optical fiber 10, the return light on which the vibration detected by the optical fiber 10 is superimposed (step S22).

Subsequently, based on the return light received by the reception unit 21, the specifying unit 23 specifies the position at which the optical fiber 10 detected the vibration (step S23).

Next, the abnormality assessment unit 22 assesses whether the vibration pattern of the return light received by the reception unit 21 is an abnormal vibration pattern (step S24). This assessment may be performed, for example, by using the above-described method A1 or A2. When the vibration pattern of the return light is not an abnormal vibration pattern (No in step S24), the process ends.

On the other hand, when the vibration pattern of the return light is an abnormal vibration pattern (Yes in step S24), the abnormality assessment unit 22 then assesses whether the abnormal vibration pattern is already known (step S25). This assessment may be performed, for example, by referring to the known vibration patterns stored in the storage unit 24, as described above. When the abnormal vibration pattern is not already known (No in step S25), the abnormality assessment unit 22 assesses that an abnormality has occurred at a position at which the optical fiber 10 detected the vibration (step S27).

Meanwhile, when the abnormal vibration pattern is already known (Yes in step S25), the abnormality assessment unit 22 then assesses whether the abnormal vibration pattern has occurred in accordance with an event (here, work), a notice of which was submitted in advance (step S26). This assessment may be performed, for example, by referring to the information of the event (e.g. work) and already known vibration patterns stored in the storage unit 24, as described above. When the abnormal vibration pattern has occurred in accordance with an event, a notice of which was submitted in advance (Yes in step S26), the process ends.

On the other hand, when the abnormal vibration pattern has not occurred in accordance with an event, a notice of which was submitted in advance (No in step S26), the abnormality assessment unit 22 assesses that an abnormality has occurred at a position at which the optical fiber 10 detected the vibration (step S27).

Figure 14:
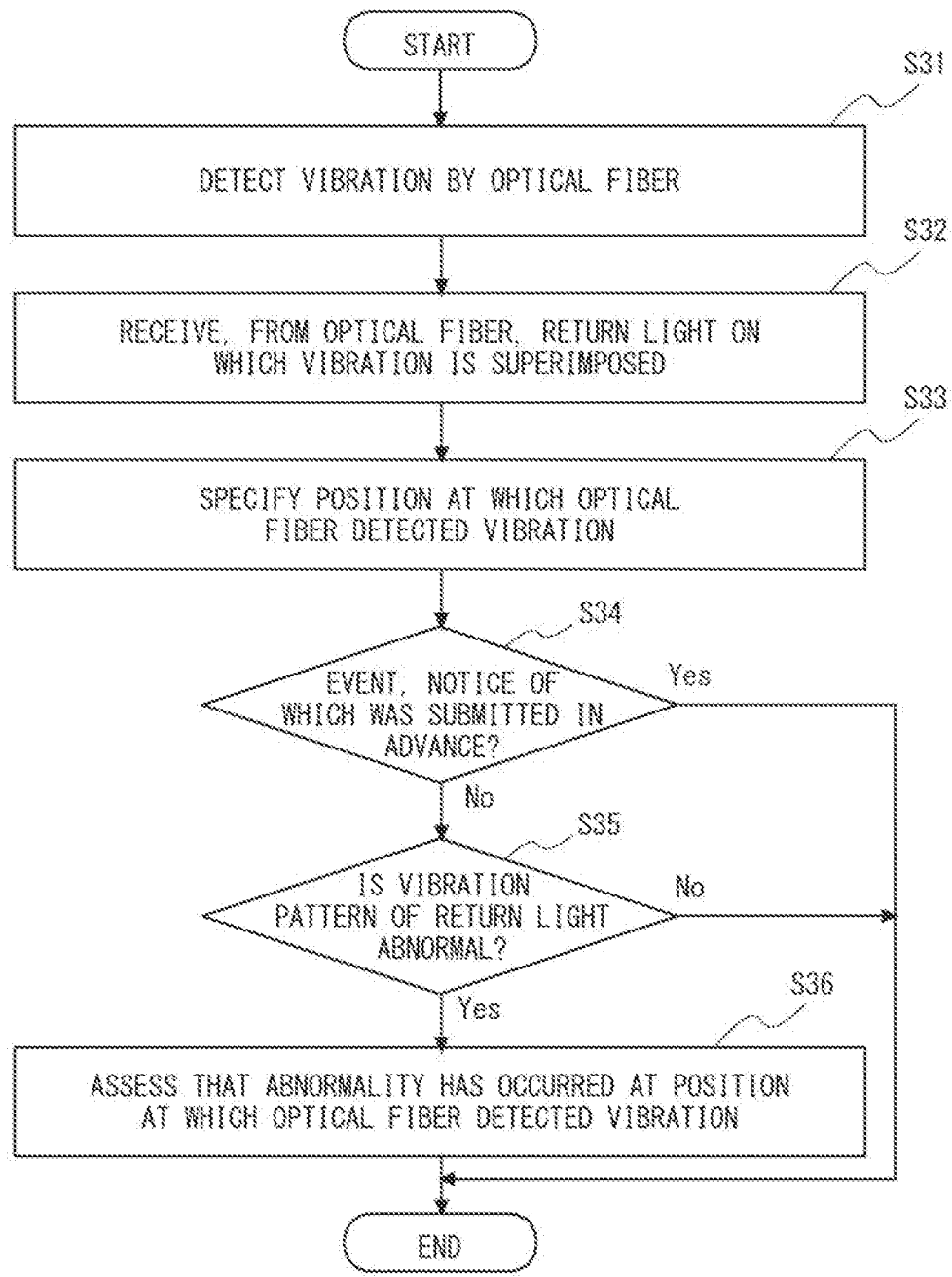
FIG. 14 is a flowchart illustrating another operation example of the optical fiber sensing system according to the second example embodiment.

Note that the operation example illustrated in FIG. 13 is merely an example, and the example embodiment is not limited to this. For example, the operation example illustrated in FIG. 13 may be modified to another operation example as illustrated in FIG. 14. Hereinafter, referring to FIG. 14, another operation example of the optical fiber sensing system according to the second example embodiment will be described.

As illustrated in FIG. 14, to begin with, steps S31 to S33, which are similar to steps S21 to S23 of FIG. 13, are executed.

Subsequently, the abnormality assessment unit 22 assesses whether the vibration pattern of the return light received by the reception unit 21 has occurred in accordance with an event (here, work), a notice of which was submitted in advance (step S34). This assessment may be performed, for example, by referring to the information of the event (e.g. work) and already known vibration patterns stored in the storage unit 24, as described above. When the vibration pattern of the return light has occurred in accordance with an event, a notice of which was submitted in advance (Yes in step S34), the process ends.

On the other hand, when the vibration pattern of the return light has not occurred in accordance with an event, a notice of which was submitted in advance (No in step S34), the abnormality assessment unit 22 then assesses whether the vibration pattern of the return light is an abnormal vibration pattern (step S35). This assessment may be performed, for example, by using the above-described method A1 or A2. When the vibration pattern of the return light is not an abnormal vibration pattern (No in step S35), the process ends.

Meanwhile, when the vibration pattern of the return light is an abnormal vibration pattern (Yes in step S35), the abnormality assessment unit 22 assesses that an abnormality has occurred at a position at which the optical fiber 10 detected the vibration (step S36).

As described above, according to the second example embodiment, the abnormality assessment unit 22 assesses that an abnormality has occurred at a position at which the optical fiber 10 detected the vibration, in the following cases:
  (1) The case where the vibration pattern of the return light is an abnormal vibration pattern, and the abnormal vibration pattern is not already known;
  (2) The case where the vibration pattern of the return light is an abnormal vibration pattern, and the abnormal vibration pattern is already known, and the abnormal vibration pattern has not occurred in accordance with an event, a notice of which was submitted in advance; and
  (3) The case where the vibration pattern has not occurred in accordance with an event, a notice of which was submitted in advance, and the vibration pattern is an abnormal vibration pattern.

Thus, in the above case (1), the occurrence of an abnormality that has not been confirmed (for example, work that has not been confirmed) can be detected. In addition, in the above cases (2) and (3), the occurrence of an abnormality, a notice of which was not submitted (e.g. unauthorized, unlicensed work), can be detected.

In addition, for example, a vibration pattern occurring in accordance with environment vibration is not an abnormal vibration pattern. Thus, even if environment vibration occurs nearby, the abnormality assessment unit 22 does not assess that an abnormality has occurred. Thereby, even if environment vibration occurs nearby, it is possible to suppress erroneous detection of the occurrence of an abnormality such as work.

Third Example Embodiment

Next, referring to FIG. 15, a description will be given of a configuration example of an optical fiber sensing system according to a third example embodiment.

Figure 15:
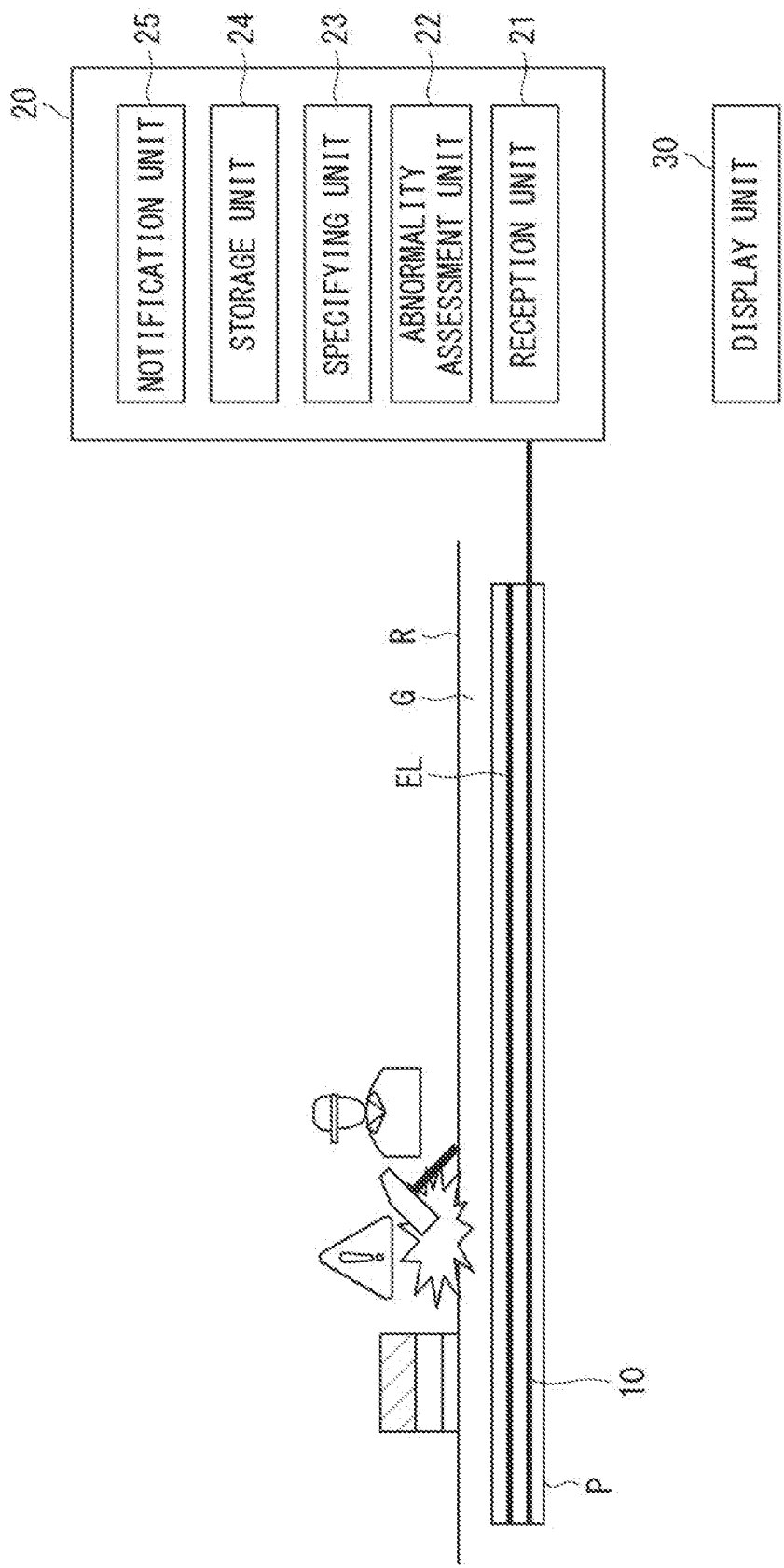
FIG. 15 is a diagram illustrating a configuration example of an optical fiber sensing system according to a third example embodiment.

As illustrated in FIG. 15, the optical fiber sensing system according to the present third example embodiment differs from the above-described configuration of FIG. 3 of the second example embodiment, with respect to the point that a display unit 30 is added, and the point that a notification unit 25 is added to the optical fiber sensing equipment 20.

The notification unit 25 notifies an alert when the abnormality assessment unit 22 assesses that an abnormality has occurred. The destination of the notification may be, for example, a monitoring system which monitors a monitoring target, a monitoring terminal disposed in a monitoring room or the like, which monitors a monitoring target, or a user terminal. In addition, the method of notification may be a method of displaying a GUI (Graphical User Interface) screen on the display unit 30 that is a display or a monitor at the destination of notification. Besides, the method of notification may be a method of outputting, by voice, a message from a speaker (not shown) at the destination of notification.

Figure 16:
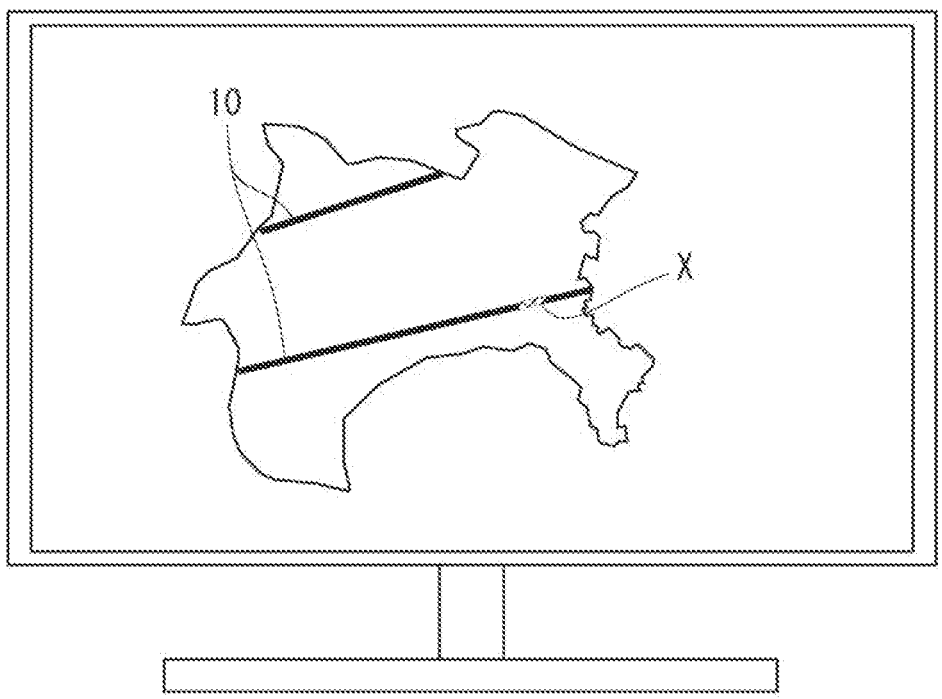
FIG. 16 is a diagram illustrating an example of a GUI screen which a notification unit according to the third example embodiment uses for notification.

In addition, the storage unit 24 may correlate and store information indicative of a position where the optical fiber 10 is laid, and map information. Furthermore, when the abnormality assessment unit 22 assesses that an abnormality has occurred, the notification unit 25 may display, by mapping, a position, at which the optical fiber 10 detected the vibration, on a map which the display unit 30 displays. FIG. 16 illustrates an example of the GUI screen which displays, by mapping, the position at which the optical fiber 10 detected the vibration. In the example of FIG. 16, on a map, positions where optical fibers 10 are laid are displayed by mapping, and a position at which the optical fiber 10 detected the vibration (i.e. a position at which an abnormality occurred) X is displayed by mapping. Note that the map illustrated in FIG. 16 can be enlarged or reduced where necessary.

Next, referring to FIG. 17, a description will be given of an operation example of the optical fiber sensing system according to the third example embodiment.

Figure 17:
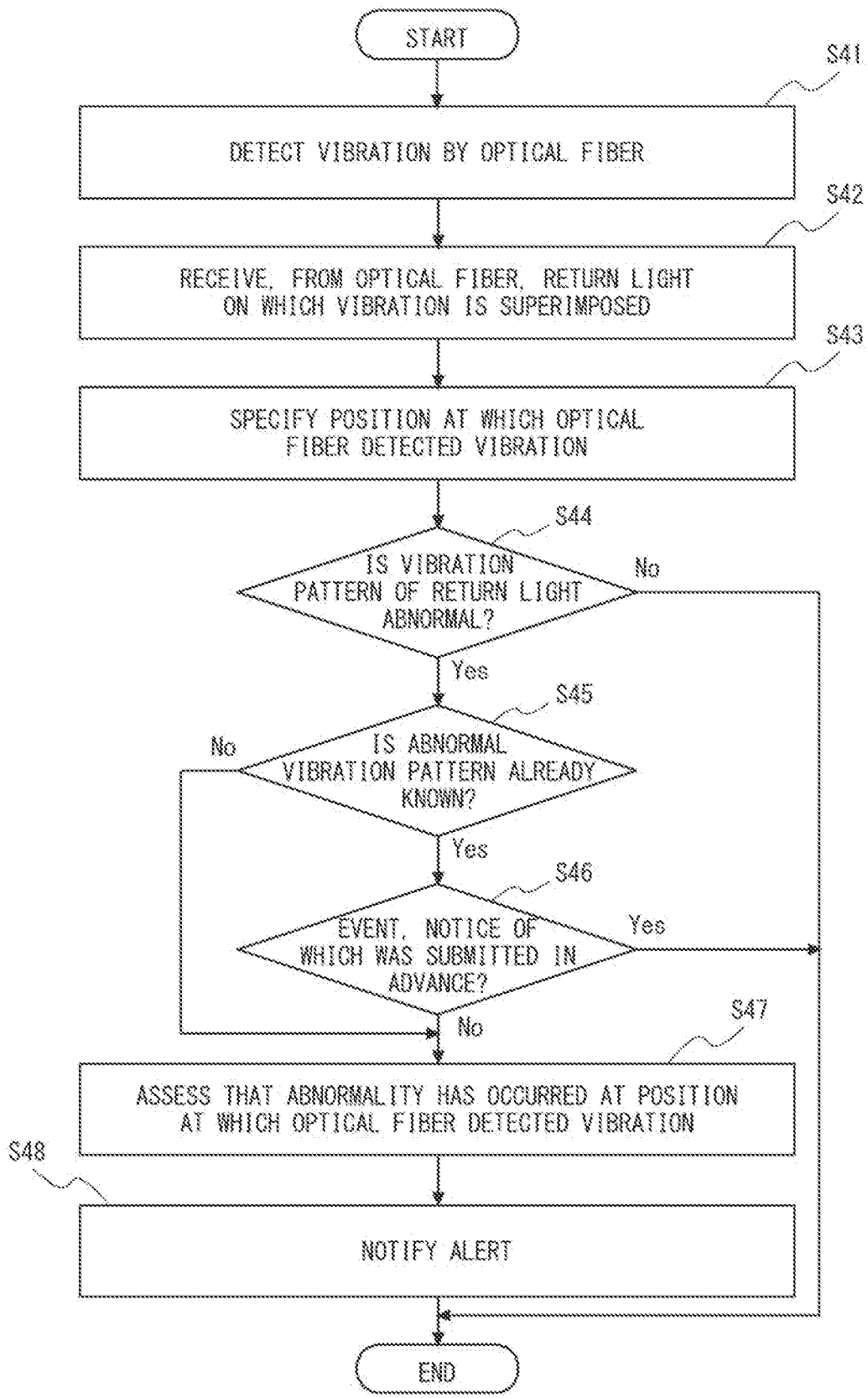
FIG. 17 is a flowchart illustrating an operation example of the optical fiber sensing system according to the third example embodiment.

As illustrated in FIG. 17, to begin with, steps S41 to S47, which are similar to steps S21 to S27 of FIG. 13, are executed.

In step S47, when the abnormality assessment unit 22 assesses that an abnormality has occurred at a position at which the optical fiber 10 detected the vibration, the notification unit 25 notifies an alert indicative of the occurrence of the abnormality (step S48).

At this time, for example, in the case where step S45 is "No" and the process goes to step S47 (i.e. the case where the vibration pattern of the return light is abnormal, and is not already known), the notification unit 25 may notify an alert indicative of the occurrence of an abnormality that is not confirmed. In the case where step S46 is "No" and the process goes to step S47 (i.e. the case where the vibration pattern of the return light is abnormal and is already known, but the notice was not submitted in advance), the notification unit 25 may notify an alert indicative of the occurrence of an abnormality, a notice of which was not submitted in advance.

Also in the case where the abnormality assessment unit 22 does not assess the occurrence of an abnormality, the notification unit 25 may notify an alert. For example, in the case where step S44 is "No" and the process ends (i.e. the vibration pattern of the return light is not abnormal), an alert indicative of the normal state may be notified. Furthermore, in the case where step S46 is "Yes" and the process ends (i.e. the case where the vibration pattern of the return light is normal and is already known, and the notice was submitted in advance), an alert indicative of the occurrence of an event, a notice of which was submitted in advance, may be notified.

Note that the operation example illustrated in FIG. 17 is merely an example, and the example embodiment is not limited to this. For example, the operation example illustrated in FIG. 17 may be modified to an operation example in which step S48 illustrated in FIG. 17 is added to the operation example as illustrated in FIG. 14.

As described above, according to the third example embodiment, when the abnormality assessment unit 22 assesses that an abnormality has occurred at a position at which the optical fiber 10 detected the vibration, the notification unit 25 notifies an alert. Thereby, the occurrence of an abnormality can be notified. The other advantageous effects are the same as in the above-described second example embodiment.

Fourth Example Embodiment

Next, referring to FIG. 18, a description will be given of a configuration example of an optical fiber sensing system according to a fourth example embodiment.

Figure 18:
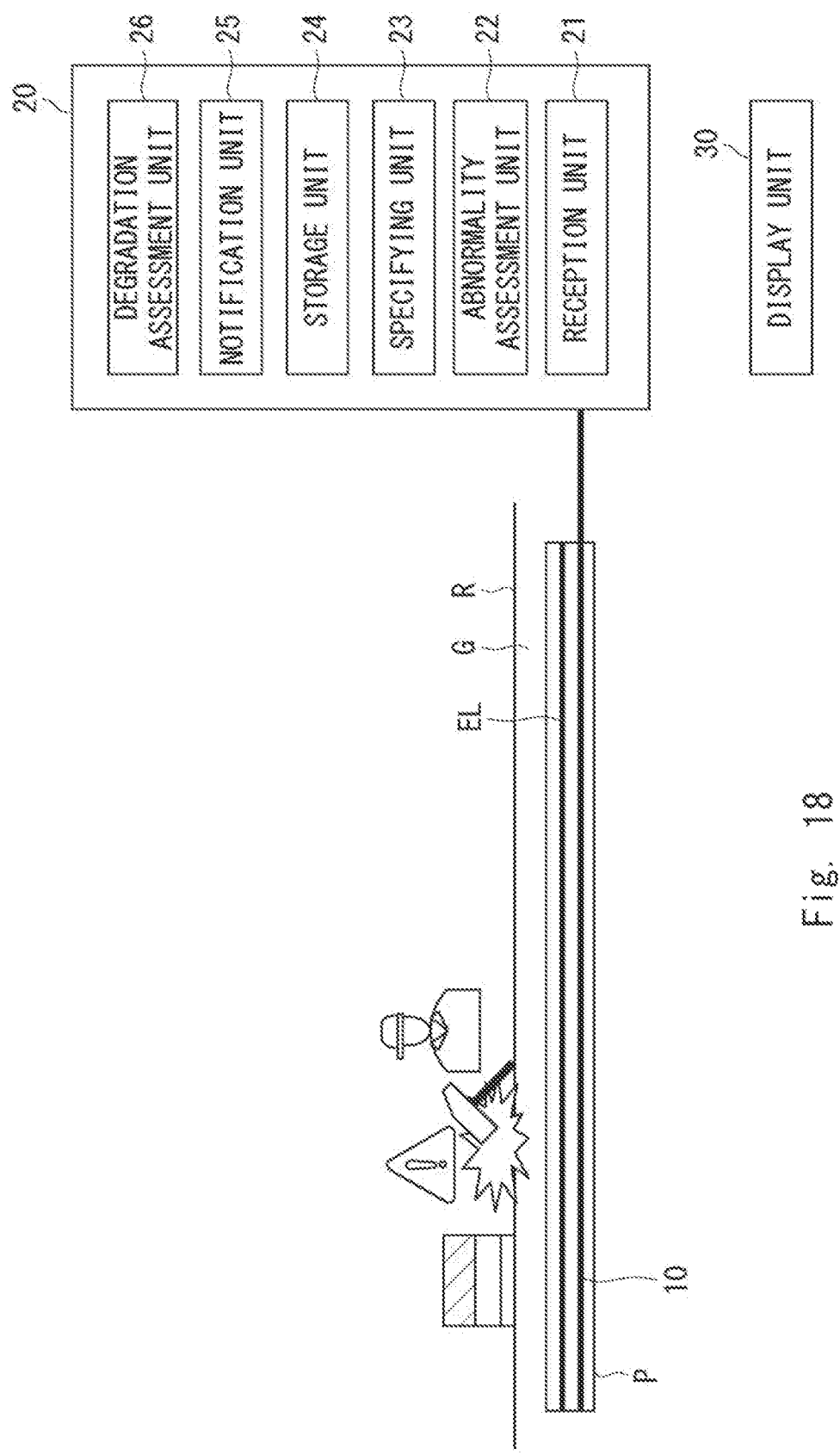
FIG. 18 is a diagram illustrating a configuration example of an optical fiber sensing system according to a fourth example embodiment.

As illustrated in FIG. 18, the optical fiber sensing system according to the present fourth example embodiment differs from the above-described configuration of FIG. 15 of the third example embodiment, with respect to the point that a degradation assessment unit 26 is added to the optical fiber sensing equipment 20.

As described above, the reception unit 21 receives the return light on which the vibration detected by the optical fiber 10 is superimposed. The return light, on which the vibration is superimposed, has a characteristic vibration pattern in which the strength and weakness of vibration, the position of vibration, the transition of variation in vibration frequency, and the like are different. This vibration pattern becomes a pattern which differs in accordance with a degradation state of the optical fiber 10. Thus, by analyzing a dynamic variation of the vibration pattern of the return light, the degradation state of the optical fiber 10 can be assessed.

Thus, the degradation assessment unit 26 detects, from the return light that the reception unit 21 received from the optical fiber 10, the vibration pattern of the return light, and assesses the degradation state of the optical fiber 10, based on the vibration pattern of the return light.

Here, a description will be given of an example of a method of assessing the degradation state of the optical fiber 10 in the degradation assessment unit 26.

(B1) Method B1

To begin with, a method B1 will be described.

Figure 19:
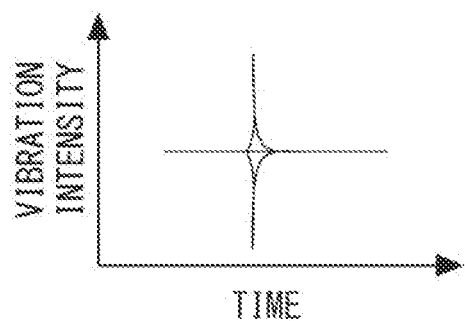
FIG. 19 is a diagram illustrating an example of a vibration pattern of return light received by a reception unit according to the fourth example embodiment.
Figure 20:
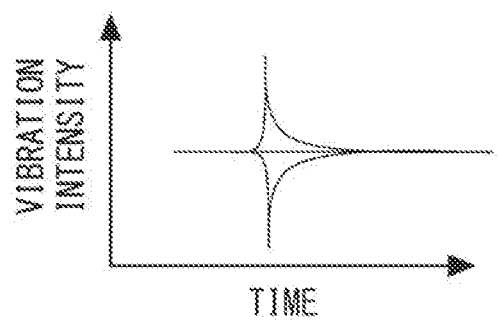
FIG. 20 is a diagram illustrating an example of a vibration pattern of return light received by the reception unit according to the fourth example embodiment.

FIG. 19 and FIG. 20 schematically illustrate vibration patterns of artificial vibration detected at a certain position on the optical fiber 10. The abscissa axis indicates time, and the ordinate axis indicates vibration intensity.

In the vibration patterns illustrated in FIG. 19 and FIG. 20, if vibration occurs, the vibration attenuates thereafter. The attenuation time differs in accordance with the degradation state of the optical fiber 10. Specifically, in the normal state of the optical fiber 10, the attenuation time is short. As the degradation of the optical fiber 10 progresses, the attenuation time becomes longer.

Thus, in the method B1, the degradation assessment unit 26 assesses the degradation state of the optical fiber 10, based on the length of the attenuation time in the vibration pattern of the return light.

(B2) Method B2

Next, a method B2 will be described.

In the method B2, a vibration pattern corresponding to the degradation state of the optical fiber 10 is learned by machine learning (e.g. deep learning or the like), and the degradation state of the optical fiber 10 is assessed by using a training result (initial training model) of machine learning.

Here, referring to FIG. 21, a method of machine learning in the method B2 will be described.

Figures 21, 22:
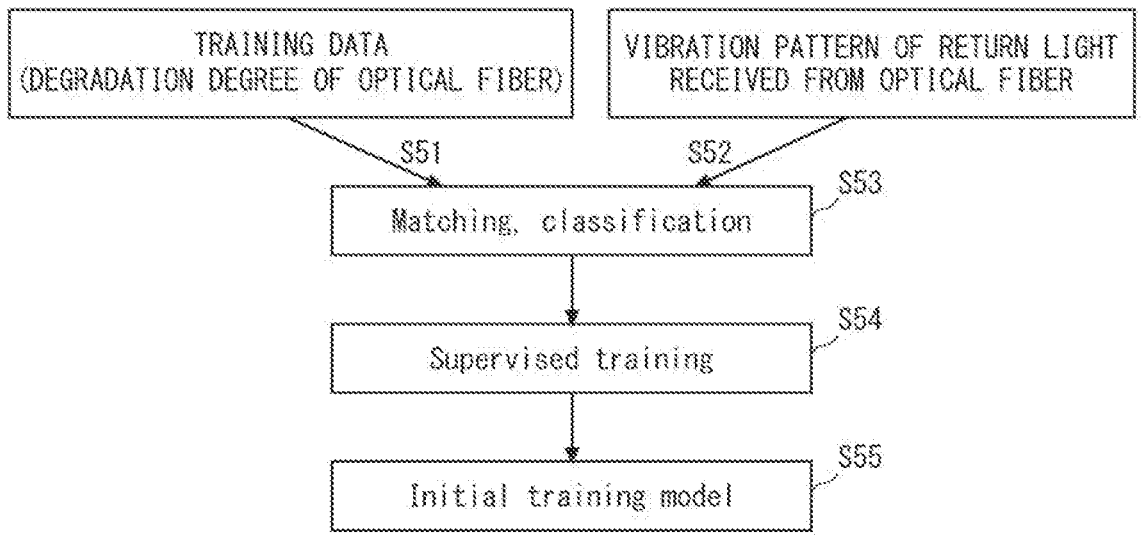
FIG. 21 is a flowchart illustrating an example of machine learning which is executed by a degradation assessment unit according to the fourth example embodiment.
FIG. 22 is a diagram illustrating an example of training data which is used in the machine learning executed by the degradation assessment unit according to the fourth example embodiment.

As illustrated in FIG. 21, the degradation assessment unit 26 inputs therein training data indicative of a degradation degree of the optical fiber 10, and a vibration pattern of return light received from the optical fiber 10 with this degradation degree (steps S51 and S52). FIG. 22 illustrates an example of the training data. FIG. 22 shows an example of training data in the case of training three vibration patterns A, B and C. Note that, in FIG. 22, it is indicated that as the value of the degradation degree is greater, the progress of degradation is greater.

Subsequently, the degradation assessment unit 26 performs matching and classification of both the training data and the vibration pattern (step S53), and performs supervised training (step S54). Thereby, an initial training model is acquired (step S55). This initial training model becomes a model in which if the vibration pattern of the return light received from the optical fiber 10 is input, the degradation degree of the optical fiber 10 is output.

When assessing the degradation state of the optical fiber 10, the degradation assessment unit 26 detects, from the return light that the reception unit 21 received from the optical fiber 10, the vibration pattern of the return light, and inputs the vibration pattern of the return light to the initial training model. Thereby, the degradation assessment unit 26 obtains the degradation degree of the optical fiber 10 as the output result of the initial training model.

Note that if the assessment result of the degradation state of the optical fiber 10 by the degradation assessment unit 26 indicates that the degradation degree of the optical fiber 10 is a threshold or more, the notification unit 25 may notify an alert. The destination of notification and the method of notification in this case are the same as in the above-described third example embodiment.

Next, a description will be given of an operation example of the optical fiber sensing system according to the fourth example embodiment. Here, in the optical fiber sensing system according to the fourth example embodiment, the operation of assessing the occurrence of an abnormality may be the same as in any one of the above-described first to third example embodiments.

Thus, hereinafter, referring to FIG. 23, a description will be given of an operation example of assessing the degradation state of the optical fiber 10 in the optical fiber sensing system according to the third example embodiment.

Figure 23:
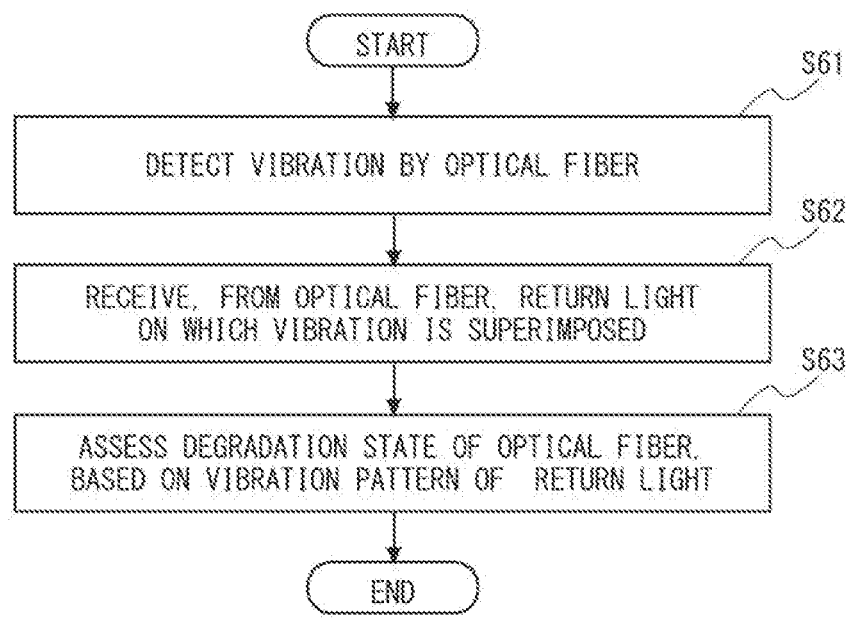
FIG. 23 is a flowchart illustrating an operation example of assessing a degradation state of an optical fiber in the optical fiber sensing system according to the fourth example embodiment.

As illustrated in FIG. 23, the optical fiber 10 detects vibration (step S61). The vibration detected by the optical fiber 10 is superimposed on the return light transmitted through the optical fiber 10.

Then, the reception unit 21 receives, from the optical fiber 10, the return light on which the vibration detected by the optical fiber 10 is superimposed (step S62).

Subsequently, the degradation assessment unit 26 assesses the degradation state of the optical fiber 10, based on the vibration pattern of the return light received by the reception unit 21 (step S63). This assessment may be performed, for example, by using the above-described method B1 or B2.

Note that, in the fourth example embodiment, the vibration used for assessing the degradation state of the optical fiber 10 is preferably a predetermined vibration, whose position of occurrence, vibration intensity and the like are predetermined. The predetermined vibration may be, for example, environment vibration, or may be vibration occurring due to construction equipment.

As described above, according to the fourth example embodiment, the degradation assessment unit 26 assesses the degradation state of the optical fiber 10, based on the vibration pattern of the return light. Thereby, it is possible to not only assess whether an abnormality has occurred, but also assess the degradation state of the optical fiber 10. The other advantageous effects are the same as in the above-described second example embodiment.

OTHER EXAMPLE EMBODIMENTS

Figure 24:
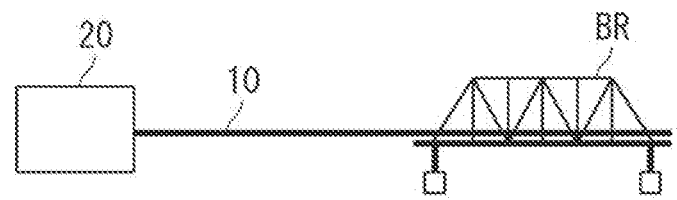
FIG. 24 is a diagram illustrating a configuration example of an optical fiber sensing system according to another example embodiment.

In the above example embodiments, the examples in which the monitoring target is the road R have been described, but the example embodiments are not limited to these examples. The monitoring target may be any target on which work may possibly occur, and may be, for example, a bridge. As illustrated in FIG. 24, when the monitoring target is a bridge BR, the optical fiber 10 may be disposed along the bridge BR.

In addition, in the above example embodiments, a plurality of structural elements (the reception unit 21, abnormality assessment unit 22, specifying unit 23, storage unit 24, notification unit 25, and degradation assessment unit 26) are provided in the optical fiber sensing equipment 20, but the example embodiments are not limited to this. The structural elements, which are provided in the optical fiber sensing equipment 20, may not be provided in one apparatus, but may be distributedly provided in a plurality of apparatuses.

Besides, in the above-described fourth example embodiment, the degradation assessment unit 26 assesses the degradation state of the optical fiber 10. However, the degradation assessment unit 26 may periodically assess the degradation state of the optical fiber 10, and may observe a state variation with time of the degradation state of the optical fiber 10. Furthermore, the degradation assessment unit 26 may assess a sign of damage of the optical fiber 10, based on the state variation with time of the degradation state of the optical fiber 10.

<Hardware Configuration of Optical Fiber Sensing Equipment>

Hereinafter, referring to FIG. 25, a description will be given of a hardware configuration of a computer 40 which realizes the optical fiber sensing equipment 20.

Figure 25:
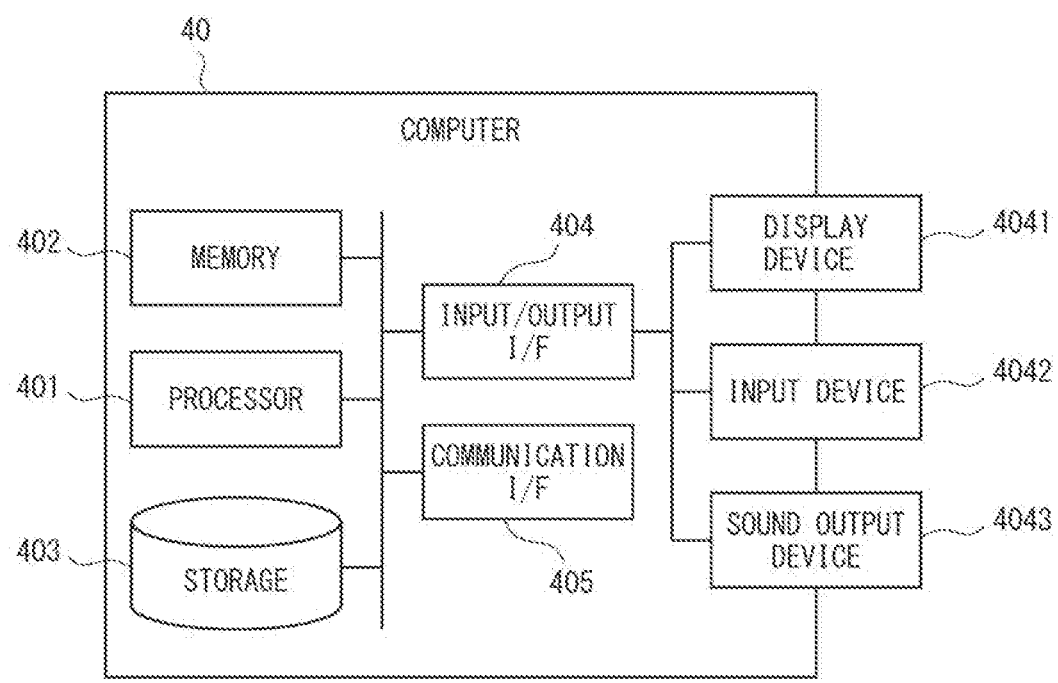
FIG. 25 is a block diagram illustrating an example of a hardware configuration of a computer which realizes the optical fiber sensing equipment according to the example embodiments.

As illustrated in FIG. 25, the computer 40 includes a processor 401, a memory 402, a storage 403, an input/output interface (input/output I/F) 404, and a communication interface (communication I/F) 405. The processor 401, memory 402, storage 403, input/output interface 404, and communication interface 405 are connected by a data transmission line for mutually transmitting and receiving data.

The processor 401 is an arithmetic processing unit such as a CPU (Central Processing Unit) or a GPU (Graphics Processing Unit). The memory 402 is a memory such as a RAM (Random Access Memory) or a ROM (Read Only Memory). The storage 403 is a storage device such as an HDD (Hard Disk Drive), an SSD (Solid State Drive), or a memory card. In addition, the storage 403 may be a memory such as a RAM or a ROM.

The storage 403 stores programs for realizing the functions of the structural elements (the reception unit 21, abnormality assessment unit 22, specifying unit 23, notification unit 25, and degradation assessment unit 26) included in the optical fiber sensing equipment 20. The processor 401 realizes the functions of the structural elements included in the optical fiber sensing equipment 20, by executing these programs. Here, when executing the programs, the processor 401 may execute the programs after reading the programs onto the memory 402, or may execute the programs without reading the programs onto the memory 402. In addition, the memory 402 and storage 403 function as the storage unit 24, and also function to store information and data held by the structural elements included in the optical fiber sensing equipment 20.

In addition, the above-described programs can be stored with use of various types of non-transitory computer readable media, and can be supplied to the computer (including the computer 40). The non-transitory computer readable media include various types of tangible storage media. Examples of the non-transitory computer readable medium include a magnetic storage medium (e.g. a flexible disc, a magnetic tape, and a hard disk drive), a magneto-optical storage medium (e.g. a magneto-optical disc), a CD-ROM (Compact Disc-ROM), a CD-R (CD-Recordable), a CD-R/W (CD-ReWritable), a semiconductor memory (e.g. a mask ROM, PROM (Programmable ROM), an EPROM (Erasable PROM), a flash ROM, and a RAM). In addition, the programs may be supplied to the computer by various types of transitory computer readable media. Examples of the transitory computer readable medium include an electric wire, an optical signal, and an electromagnetic wave. The transitory computer readable medium can supply programs to the computer via a wired communication path such as an electric wire or an optical fiber, or via a wireless communication path.

The input/output interface 404 is connected to a display device 4041, an input device 4042, and a sound output device 4043. The display device 4041 is a device, such as an LCD (Liquid Crystal Display), a CRT (Cathode Ray Tube) display or a monitor, which displays a screen corresponding to rendering data which is processed by the processor 401. The input device 4042 is a device which accepts an operation input of an operator, and is, for instance, a keyboard, a mouse, a touch sensor, and the like. The display device 4041 and the input device 4042 may be integrated and implemented as a touch panel. The sound output device 4043 is a device which outputs sound corresponding to acoustic data processed by the processor 401.

The communication interface 405 executes transmission and reception of data with an external apparatus. For example, the communication interface 405 communicates with an external apparatus via a wired communication path or a wireless communication path.

The present disclosure has been described above by referring to the example embodiments, but the present disclosure is not limited to the above example embodiments. Various modifications, which are understandable by a skilled person within the scope of the present disclosure, can be made to the configurations and details of the present disclosure.

For example, the above example embodiments may be partly or entirely combined and used.

A part or the whole of the example embodiments disclosed above can be described as, but not limited to, the following supplementary notes.

Supplementary Note 1

An optical fiber sensing system comprising:
an optical fiber configured to detect vibration;
a reception unit configured to receive, from the optical fiber, an optical signal on which the vibration detected by the optical fiber is superimposed; and
an abnormality assessment unit configured to assess whether a vibration pattern of the optical signal is already known, and to assess, when the vibration pattern of the optical signal is not already known, that an abnormality has occurred.

Supplementary Note 2

The optical fiber sensing system according to Supplementary Note 1, further comprising a specifying unit configured to specify a position at which the optical fiber detected the vibration, based on the optical signal,
wherein when the vibration pattern of the optical signal is not already known, the abnormality assessment unit assesses that an abnormality has occurred at a position at which the optical fiber detected the vibration.

Supplementary Note 3

The optical fiber sensing system according to Supplementary Note 2, further comprising a storage unit configured to prestore a predetermined vibration pattern,
wherein when the vibration pattern of the optical signal includes a vibration pattern other than the predetermined vibration pattern, the abnormality assessment unit assesses that the vibration pattern of the optical signal is not already known.

Supplementary Note 4

The optical fiber sensing system according to Supplementary Note 3, wherein the abnormality assessment unit is configured to:
assess whether the vibration pattern of the optical signal is an abnormal vibration pattern;
assess, when the vibration pattern of the optical signal is an abnormal vibration pattern, whether the abnormal vibration pattern is already known; and
assess, when the vibration pattern of the optical signal is an abnormal vibration pattern and the abnormal vibration pattern is not already known, that an abnormality has occurred at a position at which the optical fiber detected the vibration.

Supplementary Note 5

The optical fiber sensing system according to Supplementary Note 4, wherein
the storage unit prestores a predetermined event, and
the abnormality assessment unit is configured to:
assess, when the vibration pattern of the optical signal is an abnormal vibration pattern and the abnormal vibration pattern is already known, whether the abnormal vibration pattern has occurred in accordance with the predetermined event; and
assess, when the vibration pattern of the optical signal is an abnormal vibration pattern, and the abnormal vibration pattern is already known, and the abnormal vibration pattern has not occurred in accordance with the predetermined event, that an abnormality has occurred at a position at which the optical fiber detected the vibration.

Supplementary Note 6

The optical fiber sensing system according to Supplementary Note 5, wherein
the predetermined event is work, a notice of which was submitted in advance, and
the abnormality assessment unit assesses, when the vibration pattern of the optical signal is an abnormal vibration pattern, and the abnormal vibration pattern is already known, and the abnormal vibration pattern has not occurred in accordance with the predetermined event, that an unlicensed work has occurred at a position at which the optical fiber detected the vibration.

Supplementary Note 7

The optical fiber sensing system according to Supplementary Note 3, wherein
the storage unit prestores a predetermined event, and
the abnormality assessment unit is configured to:
assess whether the vibration pattern of the optical signal has occurred in accordance with the predetermined event;
assess, when the vibration pattern of the optical signal has not occurred in accordance with the predetermined event, whether the vibration pattern is an abnormal vibration pattern; and
assess, when the vibration pattern of the optical signal has not occurred in accordance with the predetermined event, and the vibration pattern is an abnormal vibration pattern, that an abnormality has occurred at a position at which the optical fiber detected the vibration.

Supplementary Note 8

The optical fiber sensing system according to Supplementary Note 7, wherein
the predetermined event is work, a notice of which was submitted in advance, and
the abnormality assessment unit assesses, when the vibration pattern of the optical signal has not occurred in accordance with the predetermined event and the vibration pattern is an abnormal vibration pattern, that an unlicensed work has occurred at a position at which the optical fiber detected the vibration.

Supplementary Note 9

The optical fiber sensing system according to any one of Supplementary Notes 2 to 8, further comprising a notification unit configured to notify an alert when the abnormality assessment unit assesses that an abnormality has occurred at a position at which the optical fiber detected the vibration.

Supplementary Note 10

The optical fiber sensing system according to Supplementary Note 9, further comprising a display unit,
wherein when the abnormality assessment unit assesses that an abnormality has occurred at a position at which the optical fiber detected the vibration, the notification unit displays, by mapping, a position, at which the optical fiber detected the vibration, on a map which the display unit displays.

Supplementary Note 11

The optical fiber sensing system according to any one of Supplementary Notes 1 to 10, further comprising a degradation assessment unit configured to assess a degradation state of the optical fiber, based on the vibration pattern of the optical signal.

Supplementary Note 12

The optical fiber sensing system according to any one of Supplementary Notes 1 to 11, wherein the optical fiber is disposed in the ground.

Supplementary Note 13

The optical fiber sensing system according to any one of Supplementary Notes 1 to 11, wherein the optical fiber is disposed along a bridge.

Supplementary Note 14

Optical fiber sensing equipment comprising:
a reception unit configured to receive, from an optical fiber configured to detect vibration, an optical signal on which the vibration detected by the optical fiber is superimposed; and
an abnormality assessment unit configured to assess whether a vibration pattern of the optical signal is already known, and to assess, when the vibration pattern of the optical signal is not already known, that an abnormality has occurred.

Supplementary Note 15

An abnormality assessment method by an optical fiber sensing system, comprising:
a step of detecting vibration by an optical fiber;
a reception step of receiving, from the optical fiber, an optical signal on which the vibration detected by the optical fiber is superimposed; and
an abnormality assessment step of assessing whether a vibration pattern of the optical signal is already known, and assessing, when the vibration pattern of the optical signal is not already known, that an abnormality has occurred.

Supplementary Note 16

The abnormality assessment method according to Supplementary Note 15, further comprising a specifying step of specifying a position at which the optical fiber detected the vibration, based on the optical signal,
wherein the abnormality assessment step includes assessing, when the vibration pattern of the optical signal is not already known, that an abnormality has occurred at a position at which the optical fiber detected the vibration.

Supplementary Note 17

The abnormality assessment method according to Supplementary Note 16, further comprising a storage step of prestoring a predetermined vibration pattern,
wherein the abnormality assessment step includes assessing, when the vibration pattern of the optical signal includes a vibration pattern other than the predetermined vibration pattern, that the vibration pattern of the optical signal is not already known.

Supplementary Note 18

The abnormality assessment method according to Supplementary Note 17, wherein the abnormality assessment step includes:
assessing whether the vibration pattern of the optical signal is an abnormal vibration pattern;
assessing, when the vibration pattern of the optical signal is an abnormal vibration pattern, whether the abnormal vibration pattern is already known; and
assessing, when the vibration pattern of the optical signal is an abnormal vibration pattern and the abnormal vibration pattern is not already known, that an abnormality has occurred at a position at which the optical fiber detected the vibration.

Supplementary Note 19

The abnormality assessment method according to Supplementary Note 18, wherein
the storage step includes prestoring a predetermined event, and
the abnormality assessment step includes:
assessing, when the vibration pattern of the optical signal is an abnormal vibration pattern and the abnormal vibration pattern is already known, whether the abnormal vibration pattern has occurred in accordance with the predetermined event; and
assessing, when the vibration pattern of the optical signal is an abnormal vibration pattern, and the abnormal vibration pattern is already known, and the abnormal vibration pattern has not occurred in accordance with the predetermined event, that an abnormality has occurred at a position at which the optical fiber detected the vibration.

Supplementary Note 20

The abnormality assessment method according to Supplementary Note 19, wherein the predetermined event is work, a notice of which was submitted in advance, and the abnormality assessment step includes assessing, when the vibration pattern of the optical signal is an abnormal vibration pattern, and the abnormal vibration pattern is already known, and the abnormal vibration pattern has not occurred in accordance with the predetermined event, that an unlicensed work has occurred at a position at which the optical fiber detected the vibration.

Supplementary Note 21

The abnormality assessment method according to Supplementary Note 17, wherein the storage step includes prestoring a predetermined event, and the abnormality assessment step includes:

assessing whether the vibration pattern of the optical signal has occurred in accordance with the predetermined event;

assessing, when the vibration pattern of the optical signal has not occurred in accordance with the predetermined event, whether the vibration pattern is an abnormal vibration pattern; and assessing, when the vibration pattern of the optical signal has not occurred in accordance with the predetermined event, and the vibration pattern is an abnormal vibration pattern, that an abnormality has occurred at a position at which the optical fiber detected the vibration.

Supplementary Note 22

The abnormality assessment method according to Supplementary Note 21, wherein the predetermined event is work, a notice of which was submitted in advance, and the abnormality assessment step includes assessing, when the vibration pattern of the optical signal has not occurred in accordance with the predetermined event and the vibration pattern is an abnormal vibration pattern, that an unlicensed work has occurred at a position at which the optical fiber detected the vibration.

Supplementary Note 23

The abnormality assessment method according to any one of Supplementary Notes 16 to 22, further comprising a notification step of notifying an alert when it is assessed in the abnormality assessment step that an abnormality has occurred at a position at which the optical fiber detected the vibration.

Supplementary Note 24

The abnormality assessment method according to Supplementary Note 23, wherein when it is assessed in the abnormality assessment step that an abnormality has occurred at a position at which the optical fiber detected the vibration, the notification step includes displaying, by mapping, a position, at which the optical fiber detected the vibration, on a map which a display unit displays.

Supplementary Note 25

The abnormality assessment method according to any one of Supplementary Notes 15 to 24, further comprising a degradation assessment step of assessing a degradation state of the optical fiber, based on the vibration pattern of the optical signal.

Supplementary Note 26

The abnormality assessment method according to any one of Supplementary Notes 15 to 25, wherein the optical fiber is disposed in the ground.

Supplementary Note 27

The abnormality assessment method according to any one of Supplementary Notes 15 to 25, wherein the optical fiber is disposed along a bridge.

This application is based upon and claims the benefit of priority from Japanese patent application No. 2019-132271, filed on Jul. 17, 2019, the disclosure of which is incorporated herein in its entirety by reference.

REFERENCE SIGNS LIST

10 OPTICAL FIBER
20 OPTICAL FIBER SENSING EQUIPMENT
21 RECEPTION UNIT
22 ABNORMALITY ASSESSMENT UNIT
23 SPECIFYING UNIT
24 STORAGE UNIT
25 NOTIFICATION UNIT
26 DEGRADATION ASSESSMENT UNIT
30 DISPLAY UNIT
40 COMPUTER
401 PROCESSOR
402 MEMORY
403 STORAGE
404 INPUT/OUTPUT INTERFACE
4041 DISPLAY DEVICE
4042 INPUT DEVICE
4043 SOUND OUTPUT DEVICE
405 COMMUNICATION INTERFACE

What is claimed is:

1. An optical fiber sensing system comprising:
an optical fiber configured to detect vibration;
a reception unit configured to receive, from the optical fiber, an optical signal on which the vibration detected by the optical fiber is superimposed;
an abnormality assessment unit configured to assess whether a vibration pattern of the optical signal is already known, and to assess, when the vibration pattern of the optical signal is not already known, that an abnormality has occurred;
a specifying unit configured to specify a position at which the optical fiber detected the vibration, based on the optical signal,
wherein when the vibration pattern of the optical signal is not already known, the abnormality assessment unit assesses that the abnormality has occurred at the position at which the optical fiber detected the vibration; and
a storage unit configured to prestore a predetermined vibration pattern,
wherein when the vibration pattern of the optical signal includes a vibration pattern other than the predetermined vibration pattern, the abnormality assessment unit assesses that the vibration pattern of the optical signal is not already known;
wherein the storage unit prestores a predetermined event, and
the abnormality assessment unit is configured to:
assess whether the vibration pattern of the optical signal has occurred in accordance with the predetermined event;
assess, when the vibration pattern of the optical signal has not occurred in accordance with the predetermined event, whether the vibration pattern is an abnormal vibration pattern; and
assess, when the vibration pattern of the optical signal has not occurred in accordance with the predetermined event, and the vibration pattern is an abnormal vibration pattern, that the abnormality has occurred at the position at which the optical fiber detected the vibration.

2. The optical fiber sensing system according to claim 1, wherein
the predetermined event is work, a notice of which was submitted in advance, and
the abnormality assessment unit assesses, when the vibration pattern of the optical signal has not occurred in accordance with the predetermined event and the vibration pattern is the abnormal vibration pattern, that an unlicensed work has occurred at the position at which the optical fiber detected the vibration.

3. The optical fiber sensing system according to claim 1, further comprising a notification unit configured to notify an alert when the abnormality assessment unit assesses that the abnormality has occurred at the position at which the optical fiber detected the vibration.

4. The optical fiber sensing system according to claim 3, further comprising a display unit,
wherein when the abnormality assessment unit assesses that the abnormality has occurred at a position at which the optical fiber detected the vibration, the notification unit displays, by mapping, the position, at which the optical fiber detected the vibration, on a map which the display unit displays.

5. The optical fiber sensing system according to claim 1, further comprising a degradation assessment unit configured to assess a degradation state of the optical fiber, based on the vibration pattern of the optical signal.

6. The optical fiber sensing system according to claim 1, wherein the optical fiber is disposed in the ground.

7. The optical fiber sensing system according to claim 1, wherein the optical fiber is disposed along a bridge.

8. An optical fiber sensing system comprising:
an optical fiber configured to detect vibration;
a reception unit configured to receive, from the optical fiber, an optical signal on which the vibration detected by the optical fiber is superimposed;
an abnormality assessment unit configured to assess whether a vibration pattern of the optical signal is already known, and to assess, when the vibration pattern of the optical signal is not already known, that an abnormality has occurred;
a specifying unit configured to specify a position at which the optical fiber detected the vibration, based on the optical signal,
wherein when the vibration pattern of the optical signal is not already known, the abnormality assessment unit assesses that the abnormality has occurred at the position at which the optical fiber detected the vibration;
a storage unit configured to prestore a predetermined vibration pattern,
wherein when the vibration pattern of the optical signal includes a vibration pattern other than the predetermined vibration pattern, the abnormality assessment unit assesses that the vibration pattern of the optical signal is not already known;
wherein the abnormality assessment unit is configured to:
assess whether the vibration pattern of the optical signal is the abnormal vibration pattern;
assess, when the vibration pattern of the optical signal is the abnormal vibration pattern, whether the abnormal vibration pattern is already known; and
assess, when the vibration pattern of the optical signal is the abnormal vibration pattern and the abnormal vibration pattern is not already known, that an abnormality has occurred at the position at which the optical fiber detected the vibration.

9. The optical fiber sensing system according to claim 8, wherein
the abnormality assessment unit is configured to:
assess, when the vibration pattern of the optical signal is the abnormal vibration pattern and the abnormal vibration pattern is already known, whether the abnormal vibration pattern has occurred in accordance with the predetermined event; and
assess, when the vibration pattern of the optical signal is the abnormal vibration pattern, and the abnormal vibration pattern is already known, and the abnormal vibration pattern has not occurred in accordance with the predetermined event, that the abnormality has occurred at the position at which the optical fiber detected the vibration.

10. The optical fiber sensing system according to claim 9, wherein
the predetermined event is work, a notice of which was submitted in advance, and
the abnormality assessment unit assesses, when the vibration pattern of the optical signal is the abnormal vibration pattern, and the abnormal vibration pattern is already known, and the abnormal vibration pattern has not occurred in accordance with the predetermined event, that an unlicensed work has occurred at the position at which the optical fiber detected the vibration.

11. Optical fiber sensing equipment comprising:
a reception unit configured to receive, from an optical fiber configured to detect vibration, an optical signal on which the vibration detected by the optical fiber is superimposed;
an abnormality assessment unit configured to assess whether a vibration pattern of the optical signal is already known, and to assess, when the vibration pattern of the optical signal is not already known, that an abnormality has occurred;
a specifying unit configured to specify a position at which the optical fiber detected the vibration, based on the optical signal,
wherein when the vibration pattern of the optical signal is not already known, the abnormality assessment unit assesses that the abnormality has occurred at the position at which the optical fiber detected the vibration; and
a storage unit configured to prestore a predetermined vibration pattern,
wherein when the vibration pattern of the optical signal includes a vibration pattern other than the predetermined vibration pattern, the abnormality assessment unit assesses that the vibration pattern of the optical signal is not already known;
wherein the storage unit prestores a predetermined event, and
the abnormality assessment unit is configured to:
assess whether the vibration pattern of the optical signal has occurred in accordance with the predetermined event;
assess, when the vibration pattern of the optical signal has not occurred in accordance with the predetermined event, whether the vibration pattern is an abnormal vibration pattern; and
assess, when the vibration pattern of the optical signal has not occurred in accordance with the predetermined event, and the vibration pattern is an abnormal vibration pattern, that the abnormality has occurred at the position at which the optical fiber detected the vibration.

12. An abnormality assessment method performed by an optical fiber sensing system, comprising:
a step of detecting vibration by an optical fiber;
a reception step of receiving, from the optical fiber, an optical signal on which the vibration detected by the optical fiber is superimposed;
an abnormality assessment step of assessing whether a vibration pattern of the optical signal is already known, and assessing, when the vibration pattern of the optical signal is not already known, that an abnormality has occurred;
a specifying step of specifying a position at which the optical fiber detected the vibration, based on the optical signal,
wherein the abnormality assessment step includes assessing, when the vibration pattern of the optical signal is not already known, that an abnormality has occurred at a position at which the optical fiber detected the vibration; and
a storage step of prestoring a predetermined vibration pattern,
wherein the abnormality assessment step includes assessing, when the vibration pattern of the optical signal includes a vibration pattern other than the predetermined vibration pattern, that the vibration pattern of the optical signal is not already known;
wherein the storage step prestores a predetermined event, and
wherein the abnormality assessment step further includes:
assessing whether the vibration pattern of the optical signal has occurred in accordance with the predetermined event;
assessing, when the vibration pattern of the optical signal has not occurred in accordance with the predetermined event, whether the vibration pattern is an abnormal vibration pattern; and
assessing, when the vibration pattern of the optical signal has not occurred in accordance with the predetermined event, and the vibration pattern is an abnormal vibration pattern, that an abnormality has occurred at a position at which the optical fiber detected the vibration.

13. The abnormality assessment method according to claim 12, wherein the abnormality assessment step includes:
assessing whether the vibration pattern of the optical signal is the abnormal vibration pattern;
assessing, when the vibration pattern of the optical signal is the abnormal vibration pattern, whether the abnormal vibration pattern is already known; and
assessing, when the vibration pattern of the optical signal is the abnormal vibration pattern and the abnormal vibration pattern is not already known, that the abnormality has occurred at the position at which the optical fiber detected the vibration.

14. The abnormality assessment method according to claim 13, wherein
the abnormality assessment step includes:
assessing, when the vibration pattern of the optical signal is the abnormal vibration pattern and the abnormal vibration pattern is already known, whether the abnormal vibration pattern has occurred in accordance with the predetermined event; and
assessing, when the vibration pattern of the optical signal is the abnormal vibration pattern, and the abnormal vibration pattern is already known, and the abnormal vibration pattern has not occurred in accordance with the predetermined event, that the abnormality has occurred at the position at which the optical fiber detected the vibration.

15. The abnormality assessment method according to claim 14, wherein
the predetermined event is work, a notice of which was submitted in advance, and
the abnormality assessment step includes assessing, when the vibration pattern of the optical signal is the abnormal vibration pattern, and the abnormal vibration pattern is already known, and the abnormal vibration pattern has not occurred in accordance with the predetermined event, that an unlicensed work has occurred at the position at which the optical fiber detected the vibration.

\* \* \* \* \*